United States Patent
Carlsson et al.

(10) Patent No.: US 12,506,643 B2
(45) Date of Patent: Dec. 23, 2025

(54) RADIO CHANNEL ESTIMATION IN A RADIO NODE

(71) Applicant: Telefonaktiebolaget LM Ericsson (publ), Stockholm (SE)

(72) Inventors: Torsten Carlsson, Lund (SE); Karl Werner, Segeltorp (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 361 days.

(21) Appl. No.: 18/245,033

(22) PCT Filed: Sep. 25, 2020

(86) PCT No.: PCT/EP2020/076867
§ 371 (c)(1),
(2) Date: Mar. 13, 2023

(87) PCT Pub. No.: WO2022/063409
PCT Pub. Date: Mar. 31, 2022

(65) Prior Publication Data
US 2024/0039767 A1    Feb. 1, 2024

(51) Int. Cl.
*H04L 25/02* (2006.01)

(52) U.S. Cl.
CPC .................... *H04L 25/0224* (2013.01)

(58) Field of Classification Search
CPC ............ H04L 25/0224; H04B 7/0617
See application file for complete search history.

(56) References Cited

U.S. PATENT DOCUMENTS

2013/0051448 A1* 2/2013 Luschi ............... H04L 25/0202
375/227

FOREIGN PATENT DOCUMENTS

| KR | 20100042657 A | * | 4/2010 | ......... H04L 27/2613 |
|---|---|---|---|---|
| WO | 0163689 A2 | | 8/2001 | |
| WO | 2020088496 A1 | | 5/2020 | |

OTHER PUBLICATIONS

NPL, Impulse Radio UWB Principles and Regulation Technical articles, Nov. 12, 2019, Infineon, retrieved from https://www.3db-access.com/article/17#:~:text=This%20trade%2Doff%20of%20instantaneous,continuous%20high%20data%20rate%20communication (Year: 2019).*
International Search Report and Written Opinion dated Jul. 19, 2021 for International Patent Application No. PCT/EP2020/076867 filed Sep. 25, 2020, consisting of 16-pages.

* cited by examiner

*Primary Examiner* — Michael A Keller
(74) *Attorney, Agent, or Firm* — Weisberg I.P. Law, P.A.

(57) ABSTRACT

Radio channel estimation in a radio node is provided. The radio node is configured to receive a number of wideband reference symbols corresponding to a wideband radio channel having a wideband bandwidth and convert the wideband reference symbols into a number of wideband taps each having a complex value and associated with a respective beam direction and a respective tap delay. The radio node dynamically determines a wideband power threshold based on channel information related to the wideband channel. Accordingly, the radio node determines a subset of the wideband taps based on the wideband power threshold and generates a channel estimate for the wideband radio channel based on the subset of wideband taps. As a result, the radio node may create a more accurate channel estimation across the wider channel bandwidth over a large span of SNR conditions.

18 Claims, 16 Drawing Sheets

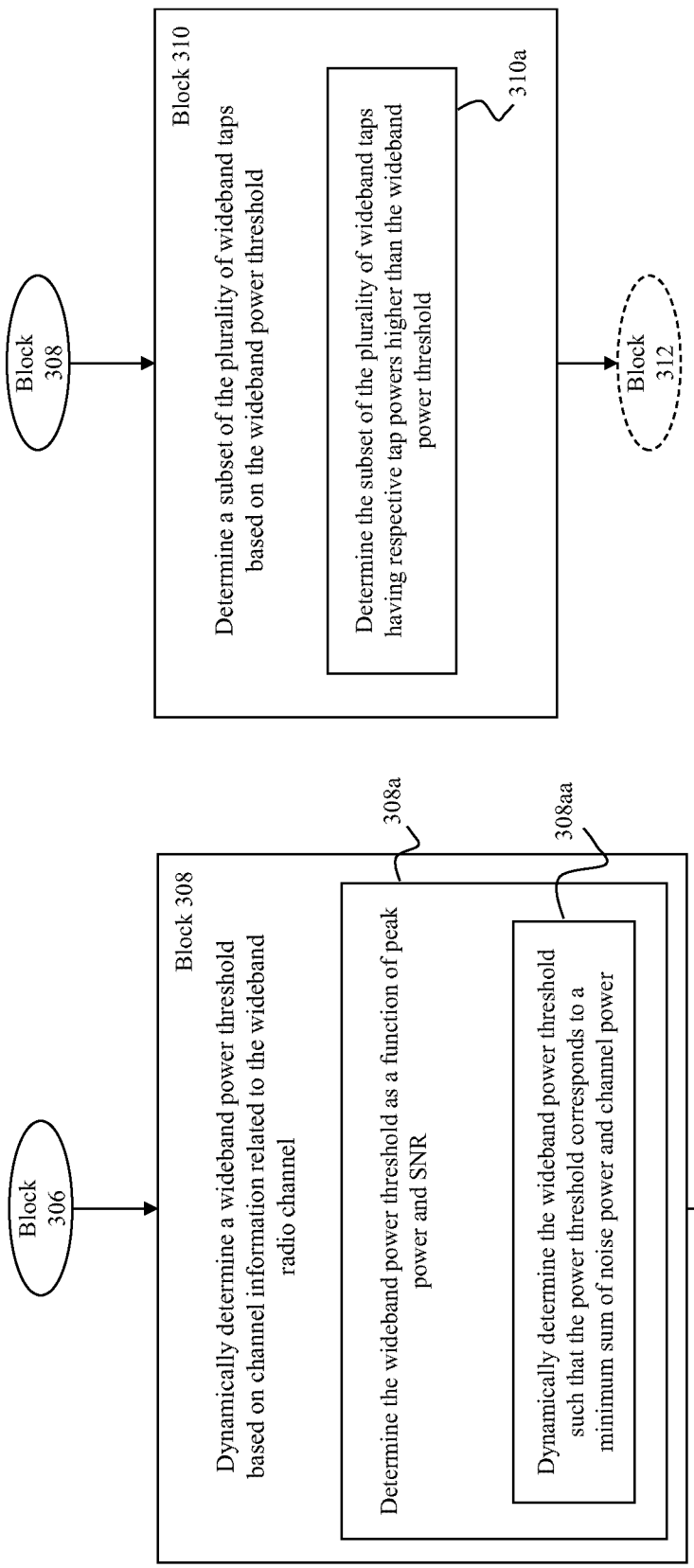

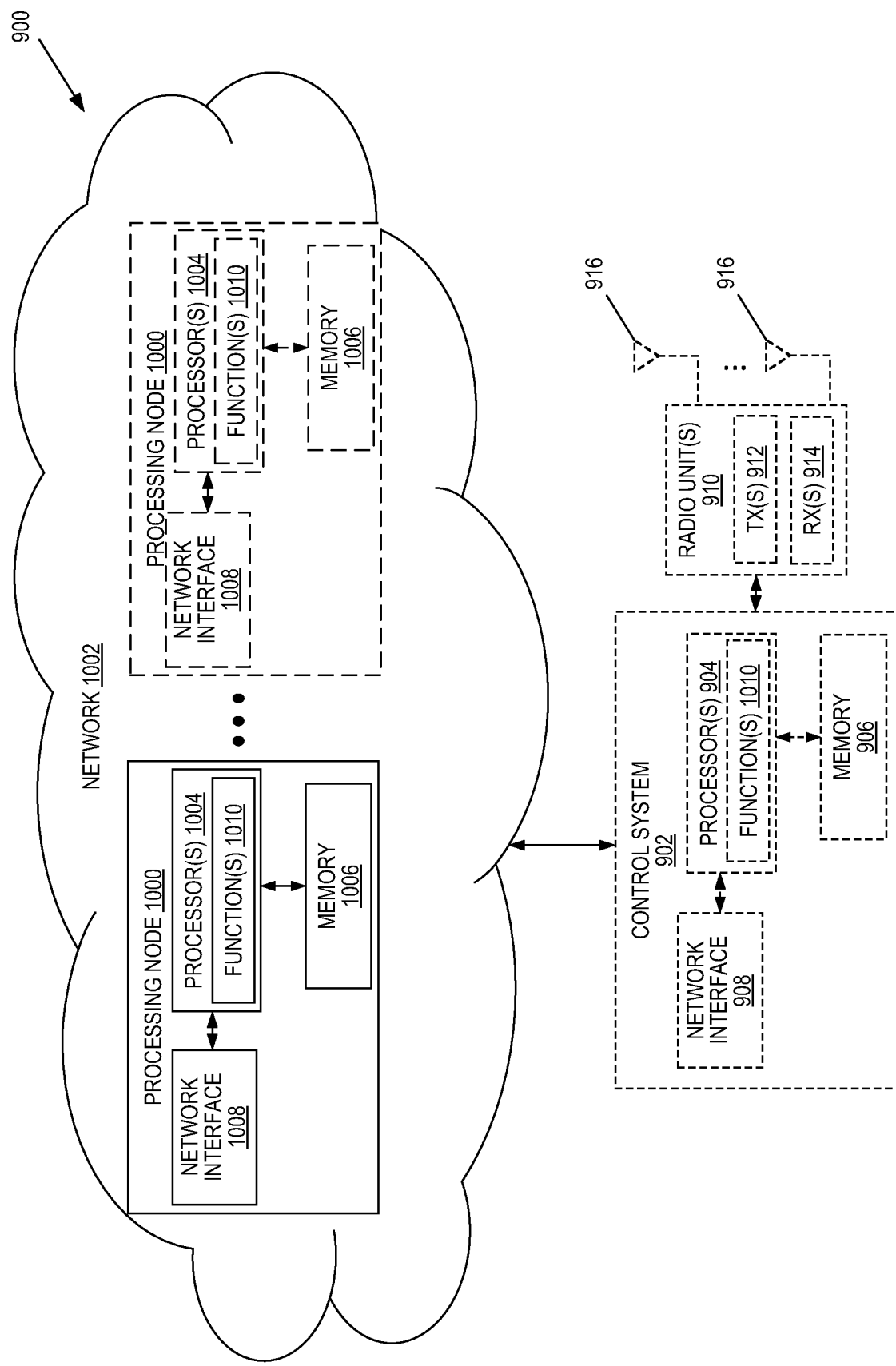

RADIO CHANNEL ESTIMATION IN A RADIO NODE

CROSS-REFERENCE TO RELATED APPLICATION

This application is a Submission Under 35 U.S.C. § 371 for U.S. National Stage Patent Application of International Application Number: PCT/EP2020/076867, filed Sep. 25, 2020 entitled "RADIO CHANNEL ESTIMATION IN A RADIO NODE," the entirety of which is incorporated herein by reference.

TECHNICAL FIELD

The technology of the disclosure relates generally to performing radio channel estimation in a wireless communications network, such as a Fifth Generation (5G) New Radio (NR) cellular communications network.

BACKGROUND

Mobile communication devices have become increasingly common in current society for providing wireless communication services. The prevalence of these mobile communication devices is driven in part by many functions that are now enabled on such devices. Increased processing capabilities in such devices means that mobile communication devices have evolved from being pure communication tools into sophisticated mobile multimedia centers that enable enhanced user experiences.

Fifth Generation (5G) New Radio (NR) is a new Radio Access Technology (RAT) widely regarded as the next generation of RAT beyond the current Third Generation (3G) and Fourth Generation (4G) RATs. A NR capable mobile communication device is expected to achieve significantly higher data rates, improved coverage range, enhanced signaling efficiency, and reduced latency compared to a conventional mobile communication device operating based on the 3G, and 4G technologies.

A NR capable radio node in a NR radio system, such as an infrastructure Base Station (BS) or a User Equipment (UE), can be configured to transmit a NR Radio Frequency (RF) signal(s) in an RF spectrum(s) that can range from 700 Megahertz (MHz) to 50 Gigahertz (GHz). Notably, Millimeter Wave (mmWave) communication, Massive Multiuser (MU) Multiple Input Multiple Output (MIMO), and spatial filtering (a.k.a., beamforming) are expected to be core technologies of the NR RAT capable of achieving unprecedentedly high-bandwidth data transmission to multiple UEs in the same time-frequency resource. The strong path loss of wave propagation at mmWave frequencies, however, necessitates the BS to acquire accurate Channel State Information (CSI) in order to perform data detection in the uplink (UE transmits to BS) and MU precoding in the downlink (BS transmits to UE). Furthermore, the trend towards BS architectures with low-precision data converters to reduce power consumption, interconnect bandwidth, and system costs renders accurate channel estimation an increasingly important aspect of wireless system design.

In general, spatial filtering refers to a technique that uses multiple antennas to simultaneously radiate an RF signal in an RF spectrum, such as the mmWave spectrum. The multiple antennas are typically organized into an antenna array (e.g., 4×4, 8×8, 16×16, etc.) and separated from each other by at least one-half (½) of a wavelength. The RF signal is pre-processed based on multiple beam weights corresponding to the multiple antennas, respectively, to generate multiple weighted RF signals. The multiple weighted RF signals are then fed to the multiple antennas, respectively, for simultaneous radiation in the RF spectrum. Each beam weight is a complex weight consisting of a respective phase term and a respective amplitude part. The phase terms in the complex beam weight can be so determined to cause the multiple simultaneously radiated RF signals to constructively combine in one direction, while destructively averaging out in other directions.

Notably, the multiple RF signals radiated from a transmitting antenna(s) can propagate via multiple paths to reach a receiving antenna(s). In this regard, to be able to accurately determine the beam weights for spatial filtering, it may be necessary to understand characteristics of the multiple propagation paths between the transmitting antenna(s) and the receiving antenna(s). The processes and/or methods for understanding the characteristics of the multiple propagation paths between a transmitting antenna(s) and a receiving antenna(s) is commonly referred to as channel estimation.

Channel estimation can be performed in uplink, downlink, or a combination thereof. In a Time Division Multiple Access (TDMA) system, for example, the RF signal is communicated between the BS and the UE using the same frequency resource. As such, the downlink channels and the uplink channels are typically reciprocal. In this regard, it may be possible to perform channel estimation on an uplink channel(s) (e.g., from UE to BS) and apply the channel estimation to a downlink channel(s) (e.g., from BS to UE), or vice versa.

There is a need for an efficient way to perform channel estimation under conditions that are expected in modern wireless network such as a NR radio access network.

SUMMARY

Embodiments of a radio node adapted to perform radio channel estimation are provided. In one embodiment, the radio node includes a radio interface adapted to receive a plurality of wideband reference symbols corresponding to a wideband radio channel having a wideband bandwidth. The radio node also includes a control circuit. The control circuit is adapted to convert the plurality of wideband reference symbols into a plurality of wideband taps each having a complex value and being associated with a respective beam direction and a respective wideband tap delay. The control circuit is also adapted to dynamically determine a wideband power threshold based on channel information related to the wideband radio channel. The control circuit is also adapted to determine a subset of the plurality of wideband taps based on the wideband power threshold and generate a channel estimate for the wideband radio channel based on the subset of the plurality of wideband taps.

In another embodiment, the control circuit is further adapted to pre-filter the channel information obtained from the plurality of wideband reference symbols to reduce noise in the channel-related information prior to or after converting the plurality of wideband reference symbols into the plurality of wideband taps.

In another embodiment, the information related to the wideband channel comprises peak power and signal-to-noise ratio (SNR), and the control circuit is further adapted to dynamically determine the wideband power threshold as a function of a value of the peak power and SNR.

In another embodiment, the information related to the wideband channel comprises peak power and SNR, and the control circuit is further adapted to dynamically determine the wideband power threshold that corresponds to a minimum sum of noise power and channel power.

In another embodiment, wherein the subset of the plurality of wideband taps are those wideband taps having respective tap powers higher than the wideband power threshold.

In another embodiment, the control circuit is further adapted to perform a narrowband process over one or more narrowband radio channels to generate a narrowband filter, wherein each of the one or more narrowband radio channels falls within the wideband radio channel and has a narrowband bandwidth narrower than the wideband bandwidth. The control circuit is further adapted to eliminate one or more of the plurality of wideband taps based on the narrowband filter, prior to generating the channel estimate for the wideband radio channel.

In another embodiment, during the narrowband process, the radio interface is further adapted to receive a plurality of narrowband reference symbols corresponding to each of the one or more narrowband radio channels, and the control circuit is further adapted to, for each of the one or more narrowband radio channels: convert the plurality of narrowband reference symbols into a plurality of narrowband taps each having a complex value associated with a respective beam direction and a respective tap delay; and determine a narrowband power threshold based on channel information related to the narrowband radio channel; determine a subset of the plurality of narrowband taps each corresponding to a highest tap power in the respective beam direction based on the narrowband power threshold. The control circuit is also configured to determine the narrowband filter based on the subset of the plurality of narrowband taps.

In another embodiment, the control circuit is further adapted to, for each of the one or more narrowband radio channels, update a narrowband tap list based on a highest-powered narrowband tap having a highest respective tap power among the subset of the plurality of narrowband taps.

In another embodiment, the narrowband tap list comprises a highest-powered narrowband tap among all of the subset of the plurality of narrowband taps corresponding to the one or more narrowband radio channels.

In another embodiment, the control circuit is further adapted to determine a maximum delay in the respective beam direction among the subset of the plurality of narrowband taps based on a count of the subset of the plurality of narrowband taps; and determine the narrowband filter comprising the maximum delay.

In another embodiment, the control circuit is further adapted to determine a proximity delay in the respective beam direction among the subset of the plurality of narrowband taps based on a respective delay area around each of the subset of the plurality of narrowband taps; and determine the narrowband filter comprising the proximity delay.

In another embodiment, the control circuit is further configured to determine a noise power estimation and a channel power estimation of a respective one of the one or more narrowband radio channels; and determine the narrowband power threshold based on the noise power estimation and the channel power estimation of the respective one of the one or more narrowband radio channels.

In another embodiment, for each of the one or more narrowband radio channels, the control circuit is further adapted to replace an existing highest-powered narrowband tap in the narrowband tap list with the determined highest-powered narrowband tap among the subset of the plurality of narrowband taps if the respective tap power of the determined highest-powered narrowband tap is higher than the respective tap power of the existing highest-powered narrowband tap in the narrowband tap list.

In another embodiment, the control circuit is further configured to add the highest-powered narrowband tap in the narrowband tap list to the subset of the plurality of wideband taps.

In one embodiment, a method implemented in a radio node for performing radio channel estimation is provided. The method includes receiving a plurality of wideband reference symbols corresponding to a wideband radio channel having a wide bandwidth. The method also includes converting the plurality of wideband reference symbols into a plurality of wideband taps each having a complex value and associated with a respective beam direction and a respective wideband tap delay. The method also includes dynamically determining a wideband power threshold based on channel information related to the wideband radio channel. The method also includes determining a subset of the plurality of wideband taps up to the wideband power threshold. The method also includes generating a channel estimation for the wideband radio channel based on the subset of the plurality of wideband taps.

In another embodiment, the method further comprises pre-filtering the channel information obtained from the plurality of wideband reference symbols to reduce noise in the channel-related information prior to or after converting the plurality of wideband reference symbols into the plurality of wideband taps.

In another embodiment, the method further comprises dynamically determining the wideband power threshold as a function of peak power and SNR comprised in the channel information related to the wideband radio channel.

In another embodiment, the method further comprises dynamically determining the wideband power threshold that corresponds to a minimum sum of noise power and channel power.

In another embodiment, the method further comprises determining the subset of the plurality of wideband taps having the respective tap power higher than the wideband power threshold.

In another embodiment, the method further comprises performing a narrowband process over one or more narrowband radio channels to generate a narrowband filter, each of the one or more narrowband radio channels fall within the wideband radio channel and have a narrowband bandwidth narrower than the wideband bandwidth; and eliminating one or more of the plurality of wideband taps based on the narrowband filter.

In another embodiment, wherein performing the narrowband process comprises: receiving a plurality of narrowband reference symbols corresponding to each of the one or more narrowband radio channels; for each of the one or more narrowband radio channels: converting the plurality of narrowband reference symbols into a plurality of narrowband taps each having a complex value and associated with a respective beam direction and a respective tap delay; determining a narrowband power threshold based on channel information related to the narrowband radio channel; and determining a subset of the plurality of narrowband taps each corresponding to a highest tap power in the respective beam direction based on the narrowband power threshold. The method also includes determining the narrowband filter based on the subset of the plurality of narrowband taps.

In another embodiment, wherein for each of the one or more narrowband channels, updating a narrowband tap list based on a highest-powered narrowband tap having a highest respective tap power among the subset of the plurality of narrowband taps.

In another embodiment, wherein the narrowband tap list comprises a highest-powered narrowband tap among all of the subset of the plurality of narrowband taps corresponding to the one or more narrowband radio channels.

In another embodiment, the method further comprises: determining a maximum delay in the respective beam direction among the subset of the plurality of narrowband taps based on a count of the subset of the plurality of narrowband taps; and determining the narrowband filter comprising the maximum delay.

In another embodiment, the method further comprises: determining a proximity delay in the respective beam direction among the subset of the plurality of narrowband taps based on a respective delay area around each of the subset of the plurality of narrowband taps; and determining the narrowband filter comprising the proximity delay. In another embodiment, the method further comprises: determining a noise power estimation and a channel power estimation of a respective one of the one or more the narrowband radio channels; and dynamically determining the narrowband power threshold based on the noise power estimation and the channel power estimation of the respective one of the one or more narrowband radio channels.

In another embodiment, the method further comprises, for each of the one or more narrowband radio channels, replacing an existing highest-powered narrowband tap in the narrowband tap list with the determined highest-powered narrowband tap among the subset of the plurality of narrowband taps if the respective tap power of the determined highest-powered narrowband tap is higher than the respective tap power of the existing highest-powered narrowband tap in the narrowband tap list.

In another embodiment, the method further comprises adding the highest-powered narrowband tap in the narrowband tap list to the subset of the plurality of wideband taps.

In another embodiment, a method implemented by a wireless node for supporting radio channel estimation performed by a base station is provided. The method includes receiving from the base station an instruction instructing the wireless node to transmit a plurality of narrowband reference symbols corresponding to at least one narrowband radio channel having a narrowband bandwidth. The method also includes transmitting the plurality of narrowband reference symbols in the at least one narrowband radio channel in response to receiving the instruction.

In another embodiment, the method further comprises transmitting the plurality of narrow band reference symbols in the at least one narrowband radio channel periodically in response to receiving the instruction from the base station.

In another embodiment, the method further comprises transmitting the plurality of narrowband reference symbols in the at least one narrowband radio channel only once in response to receiving the instruction from the base station.

In another embodiment, the method further comprises transmitting a plurality of wideband reference symbols corresponding to a wideband radio channel having a wideband bandwidth, wherein the at least one narrowband radio channel falls within the wideband radio channel and the narrowband bandwidth is narrower than the wideband bandwidth.

BRIEF DESCRIPTION OF THE DRAWINGS

The accompanying drawing figures incorporated in and forming a part of this specification illustrate several aspects of the disclosure, and together with the description serve to explain the principles of the disclosure.

FIGS. 3A-3C are flowcharts of an exemplary method that may be utilized by the radio node of FIG. 2 to perform wideband radio channel estimation in the wideband radio channel over a large span of SNR conditions;

FIG. 10 is a schematic block diagram that illustrates a virtualized embodiment of the radio access node of FIG. 9 according to some embodiments of the present disclosure;

DETAILED DESCRIPTION

Figure 1A:
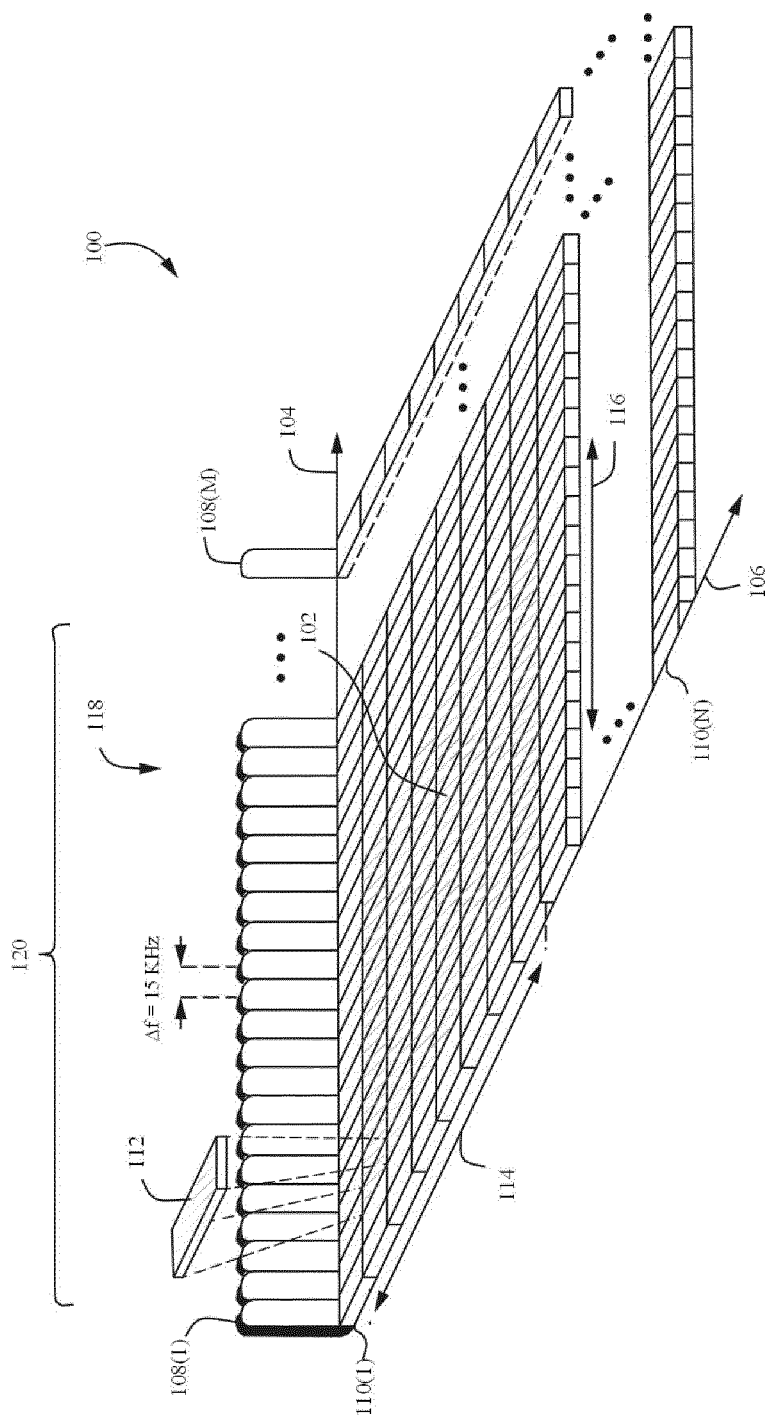
FIG. 1A is a schematic diagram of an exemplary orthogonal frequency division multiplexing (OFDM) time-frequency grid illustrating at least one resource block (RB)

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure.

Radio Node: As used herein, a "radio node" is either a radio access node or a wireless communication device.

Radio Access Node: As used herein, a "radio access node" or "radio network node" or "radio access network node" is any node in a Radio Access Network (RAN) of a cellular communications network that operates to wirelessly transmit and/or receive signals. Some examples of a radio access node include, but are not limited to, a base station (e.g., a New Radio (NR) base station (gNB) in a Third Generation Partnership Project (3GPP) Fifth Generation (5G) NR network or an enhanced or evolved Node B (eNB) in a 3GPP Long Term Evolution (LTE) network), a high-power or macro base station, a low-power base station (e.g., a micro base station, a pico base station, a home eNB, or the like), a relay node, a network node that implements part of the functionality of a base station or a network node that implements a gNB Distributed Unit (gNB-DU)) or a network node that implements part of the functionality of some other type of radio access node.

Core Network Node: As used herein, a "core network node" is any type of node in a core network or any node that implements a core network function. Some examples of a core network node include, e.g., a Mobility Management Entity (MME), a Packet Data Network Gateway (P-GW), a Service Capability Exposure Function (SCEF), a Home Subscriber Server (HSS), or the like. Some other examples of a core network node include a node implementing a Access and Mobility Function (AMF), a UPF, a Session Management Function (SMF), an Authentication Server Function (AUSF), a Network Slice Selection Function (NSSF), a Network Exposure Function (NEF), a Network Function (NF) Repository Function (NRF), a Policy Control Function (PCF), a Unified Data Management (UDM), or the like.

Communication Device: As used herein, a "communication device" is any type of device that has access to an access network. Some examples of a communication device include, but are not limited to: mobile phone, smart phone, sensor device, meter, vehicle, household appliance, medical appliance, media player, camera, or any type of consumer electronic, for instance, but not limited to, a television, radio, lighting arrangement, tablet computer, laptop, or Personal Computer (PC). The communication device may be a portable, hand-held, computer-comprised, or vehicle-mounted mobile device, enabled to communicate voice and/or data via a wireless or wireline connection.

Wireless Communication Device: One type of communication device is a wireless communication device, which may be any type of wireless device that has access to (i.e., is served by) a wireless network (e.g., a cellular network). Some examples of a wireless communication device include, but are not limited to: a User Equipment device (UE) in a 3GPP network, a Machine Type Communication (MTC) device, and an Internet of Things (IoT) device. Such wireless communication devices may be, or may be integrated into, a mobile phone, smart phone, sensor device, meter, vehicle, household appliance, medical appliance, media player, camera, or any type of consumer electronic, for instance, but not limited to, a television, radio, lighting arrangement, tablet computer, laptop, or PC. The wireless communication device may be a portable, hand-held, computer-comprised, or vehicle-mounted mobile device, enabled to communicate voice and/or data via a wireless connection.

Network Node: As used herein, a "network node" is any node that is either part of the radio access network or the core network of a cellular communications network/system.

Note that the description given herein focuses on a 3GPP cellular communications system and, as such, 3GPP terminology or terminology similar to 3GPP terminology is oftentimes used. However, the concepts disclosed herein are not limited to a 3GPP system.

Note that, in the description herein, reference may be made to the term "cell"; however, particularly with respect to 5G NR concepts, beams may be used instead of cells and, as such, it is important to note that the concepts described herein are equally applicable to both cells and beams.

Embodiments disclosed herein include radio channel estimation in a radio node, such as a base station or a user equipment (UE). Conventionally, a radio node can perform channel estimation based on reference symbols communicated in certain uplink and/or downlink reference signals. For the channel estimation to capture full channel information, the reference symbols not only need to be spread out across a wider channel bandwidth, but also need to repeat often enough to follow fast fading variations. However, the radio node may receive the reference symbols over a large span of Signal to Noise Ratios (SNRs) and from multiple radio frequency (RF) beams. As such, it may be necessary to ensure that the radio node can perform accurate channel estimation under both high-SNR and low-SNR conditions across the multiple RF beams. Typically, the radio node converts each of the received reference symbols into one or more taps and then performs channel estimation based on the taps. Each of the taps has a complex value and is associated with a respective beam direction and a respective wideband tap delay. Given that the taps are derived from the reference symbols transmitted across the wider channel bandwidth, the taps are referred to as "wideband taps" hereinafter. Understandably, since the reference symbols can represent a large span of SNRs, the taps will likewise represent the same large span of SNRs.

In embodiments disclosed herein, the radio node may eliminate some of the wideband taps associated with a lower SNR(s) from channel estimation, thus helping to suppress noise to improve channel estimation quality. In addition, the radio node may be configured to perform a narrowband channel estimation(s) in a narrower portion(s) of the wider channel bandwidth prior to performing the wideband channel estimation across the wider channel bandwidth. More specifically, the radio node receives the reference symbols across the narrower portion(s) of the wider channel bandwidth (hereinafter referred to as "narrowband reference symbols") and converts the narrowband reference symbols into one or more narrowband taps. Similar to the wideband taps, each of the narrowband taps has a complex value and is associated with a respective beam direction and a respective narrowband tap delay. Accordingly, the radio node may identify a strongest SNR(s) represented by the narrowband taps and include the strongest SNR(s) in the wideband channel estimation. Notably, a UE may concentrate output power on a smaller among resource elements during narrowband channel estimation. As such, an SNR at a receiver may be improved during narrowband sounding compared to the SNR during wideband sounding. By performing the narrowband channel estimation(s), it may be possible to improve accuracy of the wideband channel estimation under low-SNR condition. As a result, the radio node may create a more accurate channel estimation across the wider channel bandwidth over a large span of SNR conditions.

Figure 1B:
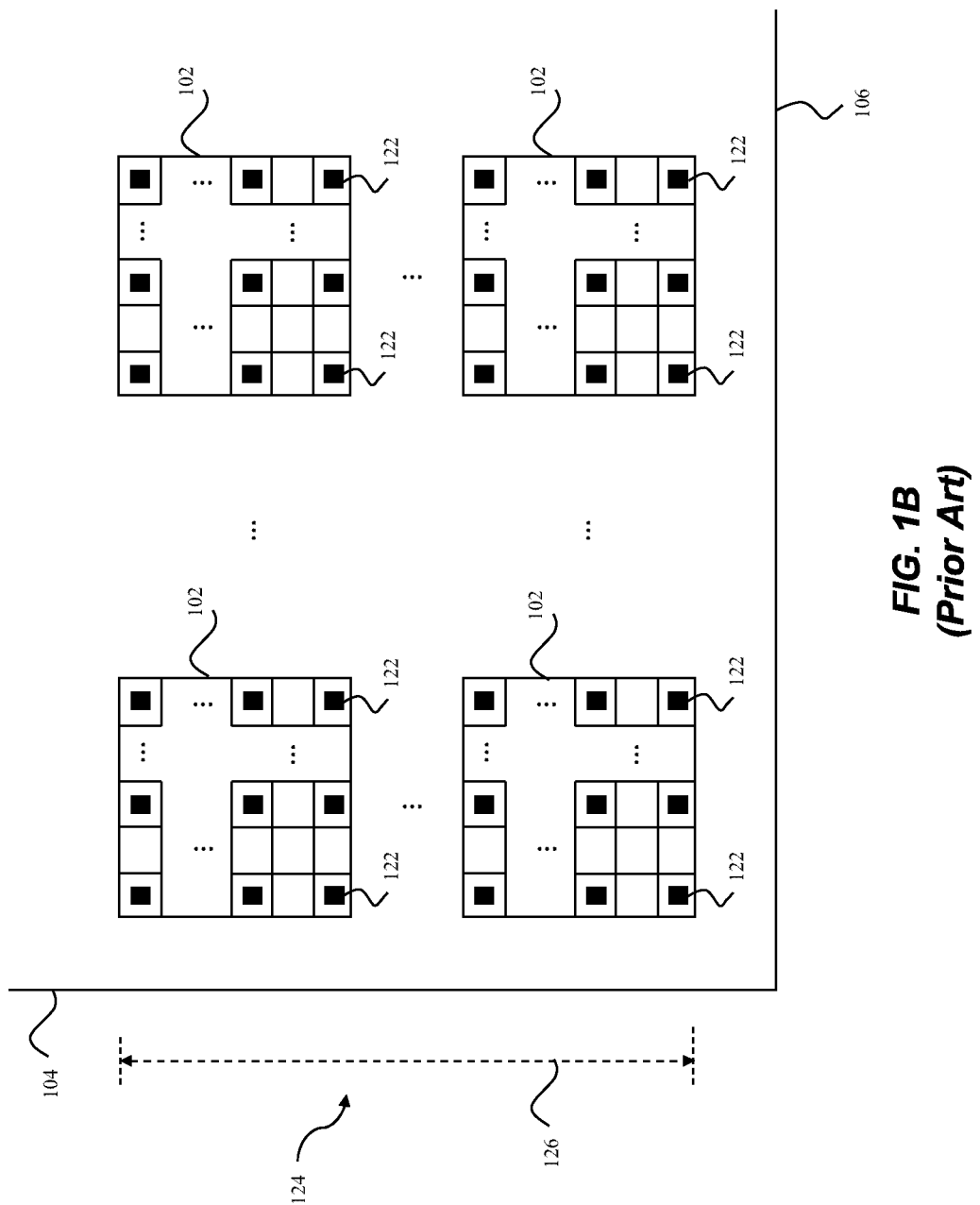
FIG. 1B is a schematic diagram providing an exemplary illustration of a number of reference symbols that can be utilized for performing uplink and/or downlink radio channel estimation.

Before discussing performing radio channel estimation of the present disclosure, a brief overview of resource allocation and reference signal transmission in a wireless communication network, such as Long-Term Evolution (LTE) and Fifth Generation New Radio (5G-NR) is first provided with reference to FIGS. 1A and 1B.

In this regard, FIG. 1A is a schematic diagram of an exemplary Orthogonal Frequency Division Multiplexing (OFDM) time-frequency grid 100 illustrating at least one Resource Block (RB) 102. The OFDM time-frequency grid 100 includes a frequency-domain axis 104 and a time-domain axis 106. Along the frequency-domain axis 104, there are a number of subcarriers 108(1)-108(M). The subcarriers 108(1)-108(M) are orthogonally separated from each other by a frequency spacing Δf (e.g., 15 KHz). Along the time-domain axis 106, there are a number of OFDM symbols 110(1)-110(N). Each intersection of the subcarriers 108(1)-108(M) and the OFDM symbols 110(1)-110(N) defines a resource element (RE) 112.

In one non-limiting example, the RB 102 includes twelve (12) consecutive subcarriers among the subcarriers 108(1)-108(M), and fourteen (14) consecutive OFDM symbols among the OFDM symbols 110(1)-110(N). In this regard, the RB 102 includes one hundred sixty-eight (168) of the REs 112 (12 subcarriers×14 OFDM symbols). The RB 102 has an RB duration 114, which equals one-half of a millisecond (0.5 ms), along the time-domain axis 106. Accordingly, the RB 102 has a bandwidth 116, which equals 180 KHz (15 KHz/subcarrier×12 subcarriers), along the frequency-domain axis 104. In OFDM-based communication systems like LTE and 5G-NR, the RB 102 is the minimum unit for allocating resources to a UE.

In a wireless network, an RF signal 118 can be transmitted over multiple subcarriers among the subcarriers 108(1)-108(M). In this regard, the RF signal 118 can correspond to a signal bandwidth 120 that is a function of the number of RBs 102 occupied by the RF signal 118 along the frequency-domain axis 104. For example, if the RF signal 118 occupies ten (10) RBs 102, then the signal bandwidth 120 will be approximately 1.8 MHz (180 KHz/RB×10 RBs). If the RF signal 118 occupies twenty-five (25) RBs 102, then the signal bandwidth 120 will be approximately 4.5 MHz (180 KHz/RB×25 RBs). If the RF signal 26 occupies two hundred (200) RBs 102, then the signal bandwidth 120 will be approximately 36 MHz (180 KHz/RB×200 RBs).

Notably, there can be a large number of different RF signals, like the RF signal 118, transmitted concurrently in the wireless network over the same or different radio channels. In this regard, the different RF signals can collectively occupy a wider channel bandwidth than the signal bandwidth 116 (e.g., a multiple of the signal bandwidth 116). As such, it may be necessary to take into consideration the wider channel bandwidth to perform an accurate channel estimation in the wireless network.

Channel estimation can be performed based on uplink and/or downlink reference signals transmitted regularly along the time-domain axis 106 and spread evenly across the frequency-domain axis 104. In this regard, FIG. 1B is a schematic diagram providing an exemplary illustration of a number of reference symbols 122 that can be utilized for performing uplink and/or downlink radio channel estimation. Common elements between FIGS. 1A and 1B are shown therein with common element numbers and will not be re-described herein.

As illustrated in FIG. 1B, the reference symbols 122 are spread across multiple subcarriers along the frequency-domain axis 104 and repeated across multiple symbols along the time-domain axis 106. In a non-limiting example, the reference symbols 122 can be uplink reference symbols associated with such uplink signals as Sounding Reference Signals (SRS), Demodulation Reference Signals (DMRS), or Physical Random Access Channels (PRACH). As previously mentioned, in a Time Division Multiple Access (TDMA) system, such as the 5G-NR system, a Radio Frequency (RF) signal(s) (e.g., the RF signal 118) may be communicated between a base station(s) (BS(s)) and UEs using the same time-frequency resource. As such, the downlink channels and the uplink channels are typically reciprocal. In this regard, the BSs may perform channel estimation based on the uplink reference symbols 122 and apply the channel estimation to a wideband downlink channel(s) 124. Accordingly, the uplink reference symbols 122 need to be spread along the frequency-domain axis 104 to cover a wideband bandwidth 126 of the wideband downlink channel(s) 124.

Notably, the uplink reference symbols 122 may be transmitted by UEs located far from or near to the BSs. As such, the uplink reference symbols 122 may arrive at the BSs via different propagation paths and thus corresponding to different SNRs. In this regard, some of the uplink reference symbols 122 may have weak SNRs. However, the uplink reference symbols 122 with the weaker SNRs may be the only uplink reference symbols that can reach the BSs from UE(s) located farther away from the BSs, and thus must be accounted for in the channel estimation. In this regard, it may be desirable to perform accurate radio channel estimation over a large span of SNR conditions.

Figure 2:
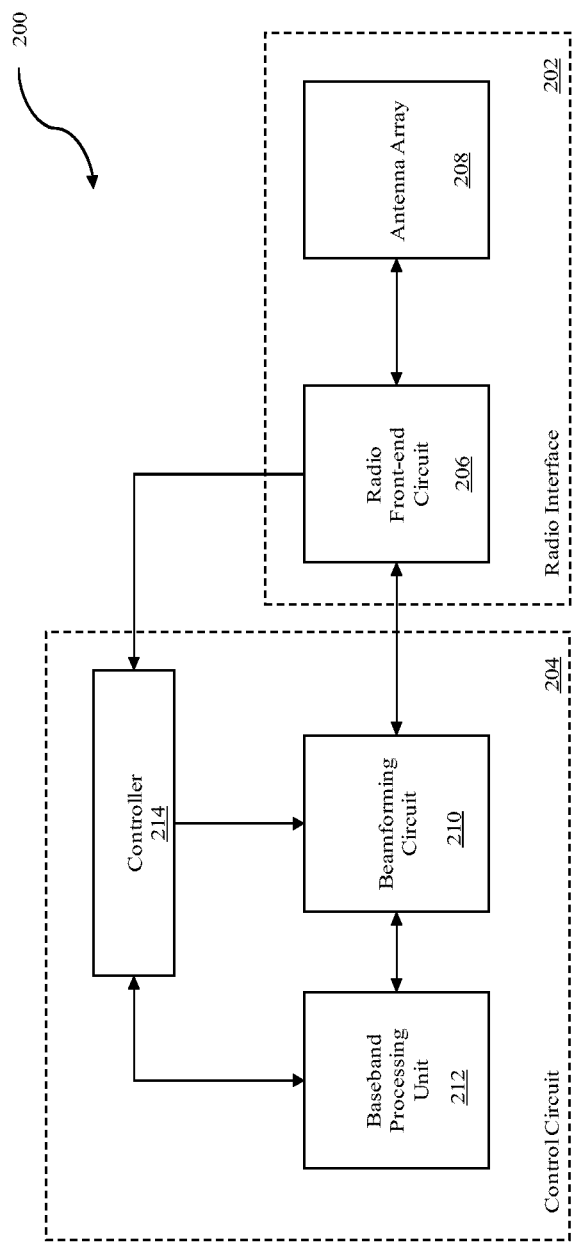
FIG. 2 is a schematic diagram of an exemplary radio node configured according to embodiments of the present disclosure to perform radio channel estimation in a wideband radio channel over a large span of Signal to Noise Ratio (SNR) conditions.

In this regard, FIG. 2 is a schematic diagram of an exemplary radio node 200 configured according to embodiments of the present disclosure to perform radio channel estimation in a wideband radio channel over a large span of SNR conditions. The radio node 200 includes a radio interface 202 and a control circuit 204. In a non-limiting example, the radio interface 202 includes a radio front-end circuit 206 and an antenna array 208, and the control circuit 204 includes a beamforming circuit 210 and a baseband processing unit 212. The antenna array 208 may include a number of antenna elements (hereinafter referred to as "elements"). The control circuit 204 may also include a controller 214 implemented by a microprocessor, a microcontroller, or a field-programmable gate array (FPGA), as an example.

In examples discussed herein, the radio node 200 refers to a base station (e.g., an eNB in LTE or a gNB in 5G-NR) and is configured to perform uplink radio channel estimation based on a method(s) discussed below. However, it should be appreciated that the radio node 200 may alternatively be a wireless communication device (e.g., a UE) configured to perform downlink radio channel estimation based on the same method(s) discussed with respect to uplink radio channel estimation.

Figure 3A:
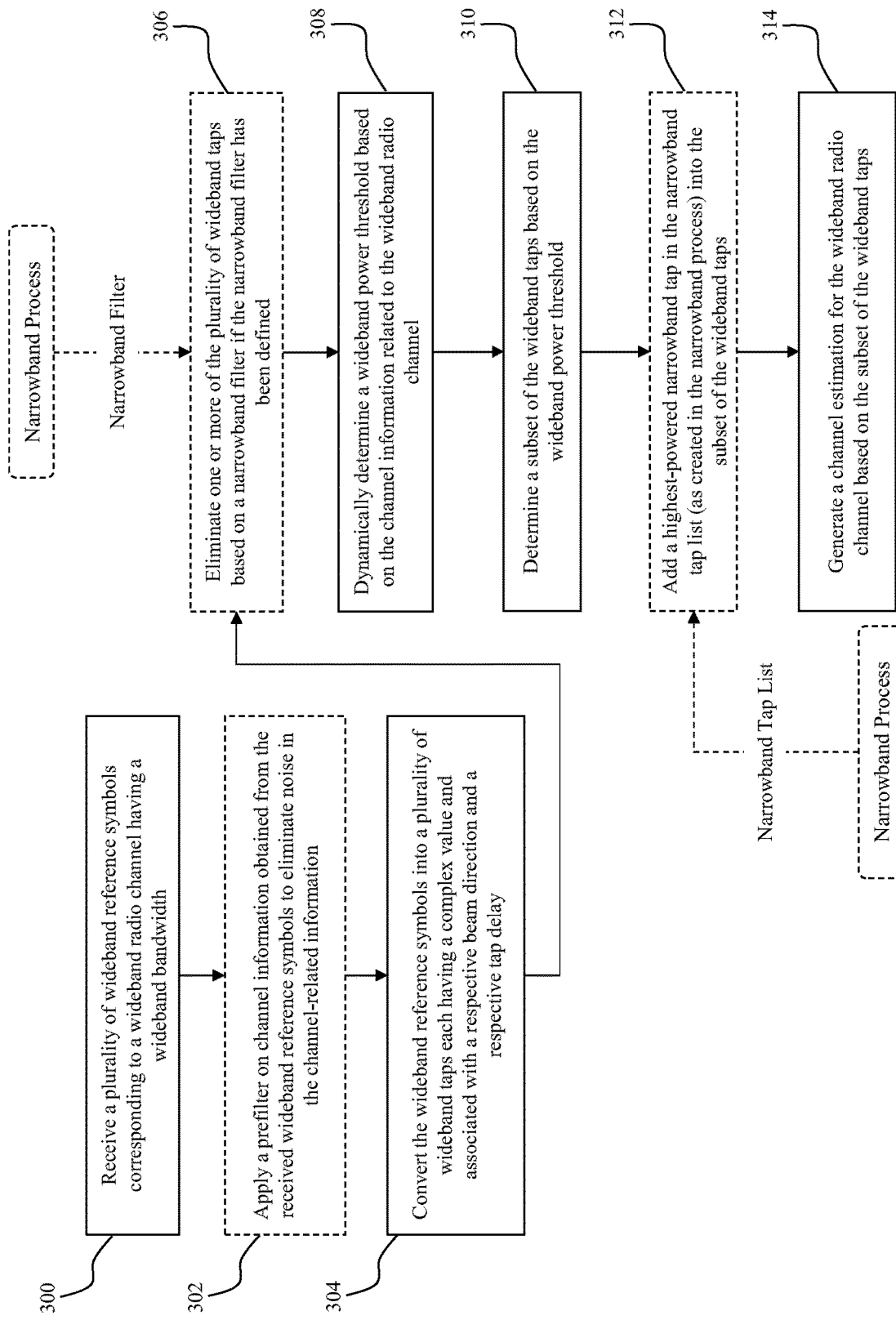

FIGS. 3A-3C are flowcharts of an exemplary method that may be utilized by the radio node 200 of FIG. 2 to perform wideband radio channel estimation in the wideband radio channel over a large span of SNR conditions. The radio interface 202 is configured to receive a plurality of wideband reference symbols, such as the reference symbols 122 in FIG. 1B (step 300). The wideband reference symbols may spread across the wideband radio channel, such as the wideband downlink channel(s) 124 in FIG. 1B, to cover a wideband bandwidth, such as the wideband bandwidth 126 in FIG. 1B.

Notably, the radio node 200 relies on channel information obtained from the wideband reference symbols to perform the wideband radio channel estimation. Given that the wideband reference symbols may arrive at the radio interface 202 via multiple propagation paths, the channel information obtained from the received reference symbols can be associated with a certain level of noise and reflect different degree of propagation delay. In this regard, the control circuit 204 may optionally apply a prefilter on the channel information obtained from the received wideband reference symbols to reduce the noise in the channel information obtained from the received wideband reference symbols (step 302). For example, the control circuit 204 can create the prefilter based on such a priori knowledge as how fast the wideband radio channel can change and/or a maximum delay spread (e.g., cyclic prefix) of the wideband radio channel. In this regard, the control circuit 204 may perform averaging in frequency domain based on the a priori knowledge to eliminate the channel information having longer than the maximum delay spread. By applying the prefilter to eliminate some of the wideband reference symbols, it may be possible to reduce computational overhead and statistical uncertainty, thus helping to improve performance of the radio node 200.

The control circuit 204 is configured to convert the wideband reference symbols into a number of wideband taps (e.g., discrete values) (step 304). Herein, a wideband tap refers to a coefficient generated as a result of a linear transformation(s), such as Discrete Cosine Transform (DCT), Inverse DCT (IDCT), Discrete Fourier Transform (DFT), and Inverse DFT (IDFT), performed on the wideband reference symbols. In a non-limiting example, the control circuit 204 can start with performing in-phase and quadrature (I/Q) sampling on each antenna element. Subsequently, the control circuit 204 can transform the I/Q samples from time domain to frequency domain such that each resource element (RB) would correspond to one I/Q sample. The control circuit 204 may apply a match filter to remove transmitter symbol information and only keep raw radio channel information. The control circuit 204 may perform a simple multiplication with a conjugate of each symbol in the frequency domain. The control circuit 204 may transform the resource elements to concentrate information and subsequently perform beam transformation to transform the concentrated information to a beam/subcarrier domain. The control circuit 204 may perform DCT such that each of the wideband taps can correspond to a complex value representing the received channel-related information for a specific point in the beam/delay domain (i.e., for a specific beam direction and delay combination). Notably, the delay represents an approximation of the propagation delay. The control circuit 204 may further combine (e.g., average) information received via all wideband reference symbols in a particular time unit (e.g., a slot). As a result of the above transformations, each of the wideband taps can have a complex value and be associated with a respective beam direction and a respective wideband tap delay in the beam/delay domain.

The control circuit 204 may optionally perform a narrowband process over one or more narrowband radio channels that falls within the wideband radio channel and each has a narrowband bandwidth narrower than the wideband bandwidth. As discussed below in FIGS. 4A-4D, the narrowband process determines a narrowband filter and a narrowband tap list for the wideband radio channel estimation. In a non-limiting example, the wideband radio channel can span across tens or even hundreds of the RBs 102 along the frequency-domain axis 104 in FIG. 1A. In contrast, the narrowband radio channel can span across as few as four (4) of the RBs 102 along the frequency-domain axis 104. As such, the narrowband radio channels can be said to be part of the wideband radio channel. In a non-limiting example, the control circuit 204 can perform the narrowband radio channel estimation independent from the wideband radio channel estimation or in conjunction with the wideband radio channel estimation.

Notably, the control circuit 204 may perform the narrowband process in a number of repetitions. Each of the repetitions may be performed based on a different one of the narrowband radio channels. As a result, it may be possible to perform the narrowband process over a set of frequencies to minimize probability of performing a measurement(s) in a particular fading dip, thus helping to improve accuracy of the narrowband radio channel estimation, particularly in a fast-fading radio environment.

Figure 4A:
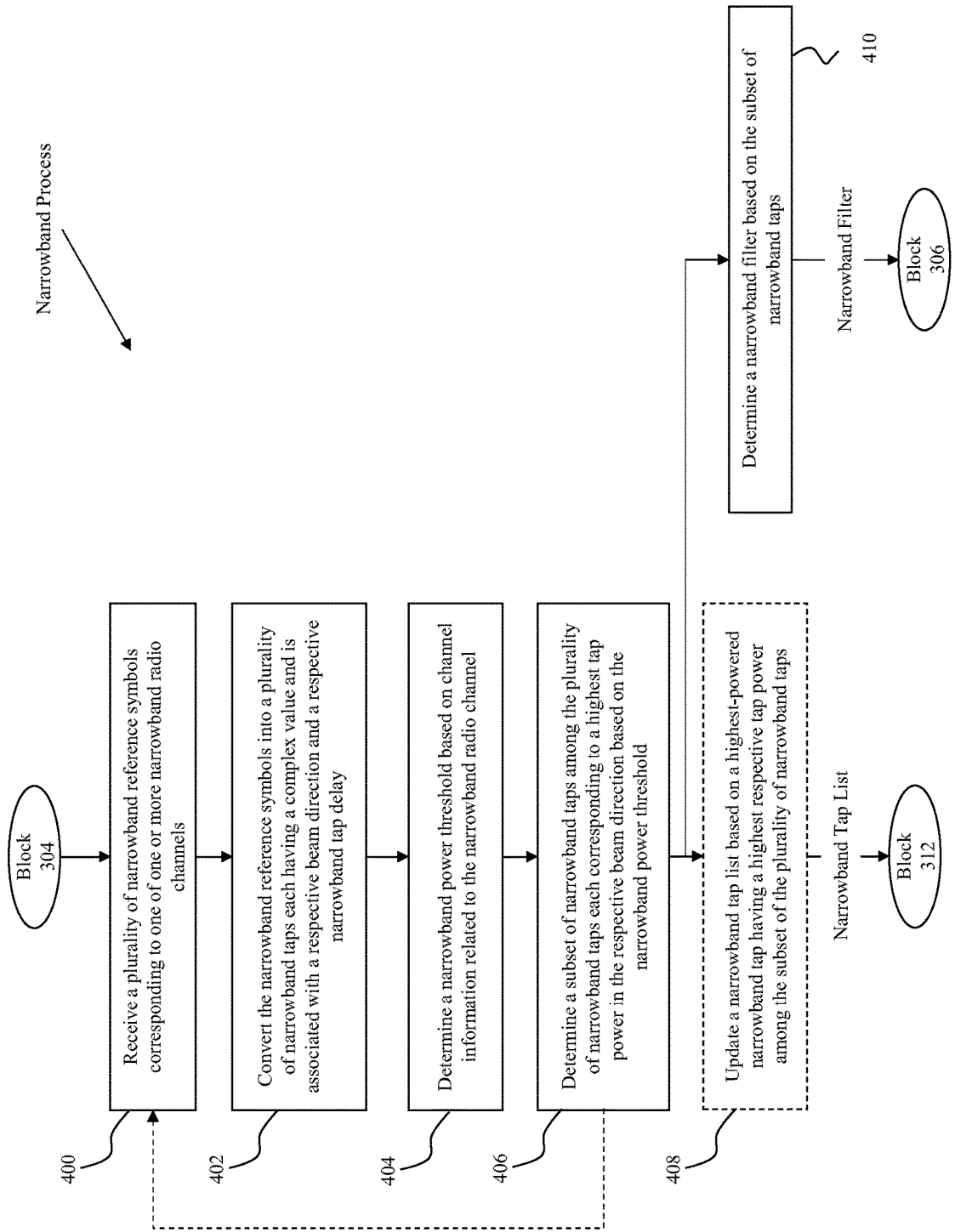
FIGS. 4A-4D are flowcharts of an exemplary method that may be utilized by the radio node of FIG. 2 to perform narrowband radio channel estimation over one or more narrowband radio channels.

The control circuit 204 may perform the narrowband process over each of the narrowband radio channels based on a method. In this regard, FIGS. 4A-4D are flowcharts of an exemplary method that may be utilized by the radio node 200 of FIG. 2 to perform narrowband process over each of the narrowband radio channels. Common elements between FIGS. 3A and 4A are shown therein with common element numbers and will not be re-described herein.

With reference to FIG. 4A, during the narrowband process, the radio interface 202 is configured to receive a plurality of narrowband reference symbols corresponding to one of the narrowband radio channels (step 400). The narrowband reference symbols can be identical to or different from the wideband reference symbols. In a non-limiting example, the narrowband reference symbols can be uplink reference symbols associated with such uplink reference signals as SRS, DMRS, or PRACH.

The control circuit 204 converts the narrowband reference symbols into a plurality of narrowband taps (e.g., discrete values) each having a complex value and associated with a respective beam direction (e.g., a direction of main lobe) and a respective narrowband tap delay (step 402). In this regard, the narrowband taps are associated with a plurality of beam directions and a plurality of narrowband tap delays, respectively. Herein, a narrowband tap refers to a coefficient generated as a result of a linear transformation(s), such as DCT, IDCT, DFT, and IDFT, performed on the narrowband reference symbols. In a non-limiting example, the control circuit 204 can transform the narrowband reference symbols into the narrowband taps based on an identical method as described above for transforming the wideband reference symbols into the wideband taps.

Figure 4B:
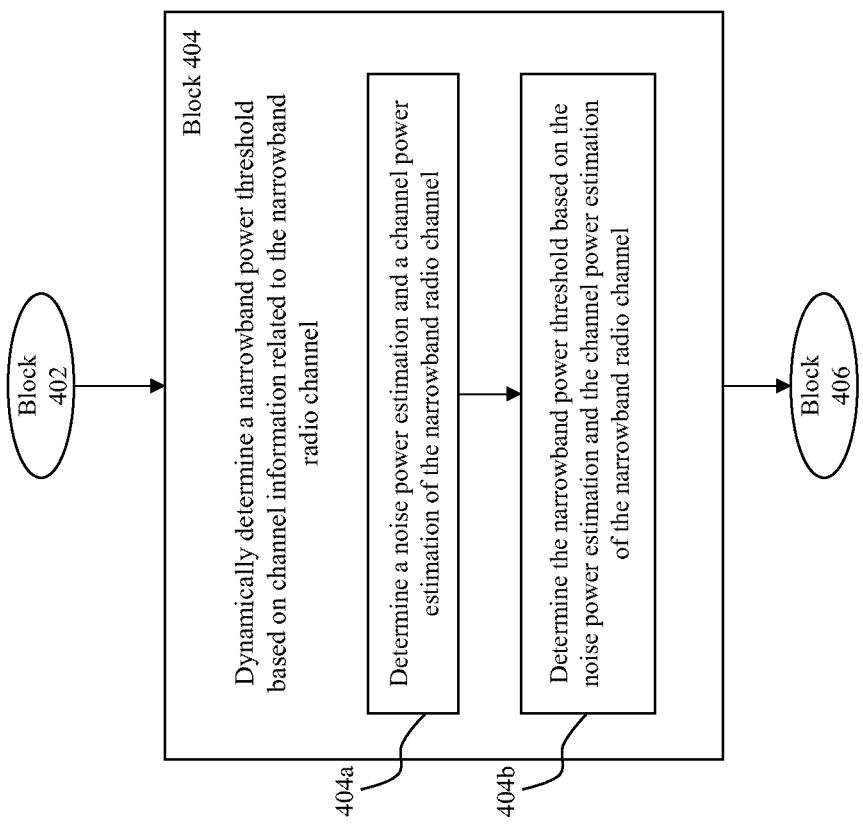

The control circuit 204 determines a narrowband power threshold (step 404). FIG. 4B is a flowchart showing an example of dynamically determining the narrowband power threshold in step 404. Specifically, the control circuit 204 determines a noise power estimation and a channel power estimation of the narrowband radio channel (step 404a). The control circuit 204 dynamically determines the narrowband power threshold based on the noise power estimation and the channel power estimation of the narrowband radio channel (step 404b).

The control circuit 204 then determines a subset of the narrowband taps each corresponding to a highest tap power in the respective beam direction based on the narrowband power threshold (step 406). In this regard, the control circuit 204 determines the subset of the narrowband taps to include a highest-powered narrowband tap in each of the beam directions. Notably, the control circuit 204 may repeat steps 400 through 406 so as to generate the subset of narrowband taps having the highest tap power in each of the beam directions. In other words, by determining the subset of the narrowband taps based on the narrowband power threshold, the control circuit 204 eliminates some of the narrowband taps in each beam direction based on the narrowband power threshold to help reduce noise and reduce computational overhead.

Figure 4C:
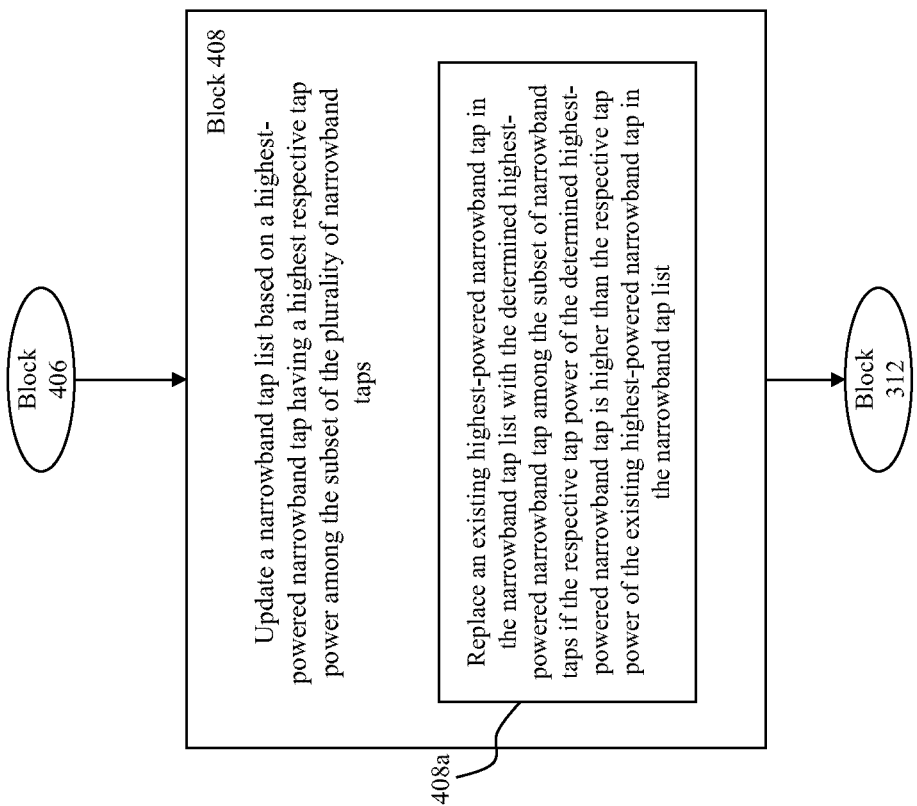

The control circuit 204 updates a narrowband tap list based on the highest-powered narrowband tap having a highest respective tap power among the determined subset of the narrowband taps (step 408). FIG. 4C is a flowchart showing an example of updating the narrowband tap list in step 408. The control circuit 204 replaces an existing highest-powered narrowband tap in the narrowband tap list with the determined highest-powered narrowband tap among the subset of the narrowband taps if the respective tap power of the determined highest-powered narrowband tap is higher than that of the existing highest-powered narrowband tap in the narrowband tap list (step 408*a*). Understandably, by repeating steps 400 to 408 across the narrowband radio channels, the narrowband tap list will include the highest-powered narrowband taps among all of the narrowband radio channels. As further described later, by determining and recording the highest-powered narrowband tap across the narrowband radio channels, it is possible to create a fallback solution under low SNR conditions, thus helping to improve wideband radio channel estimation under the low-SNR conditions.

Figure 4D:
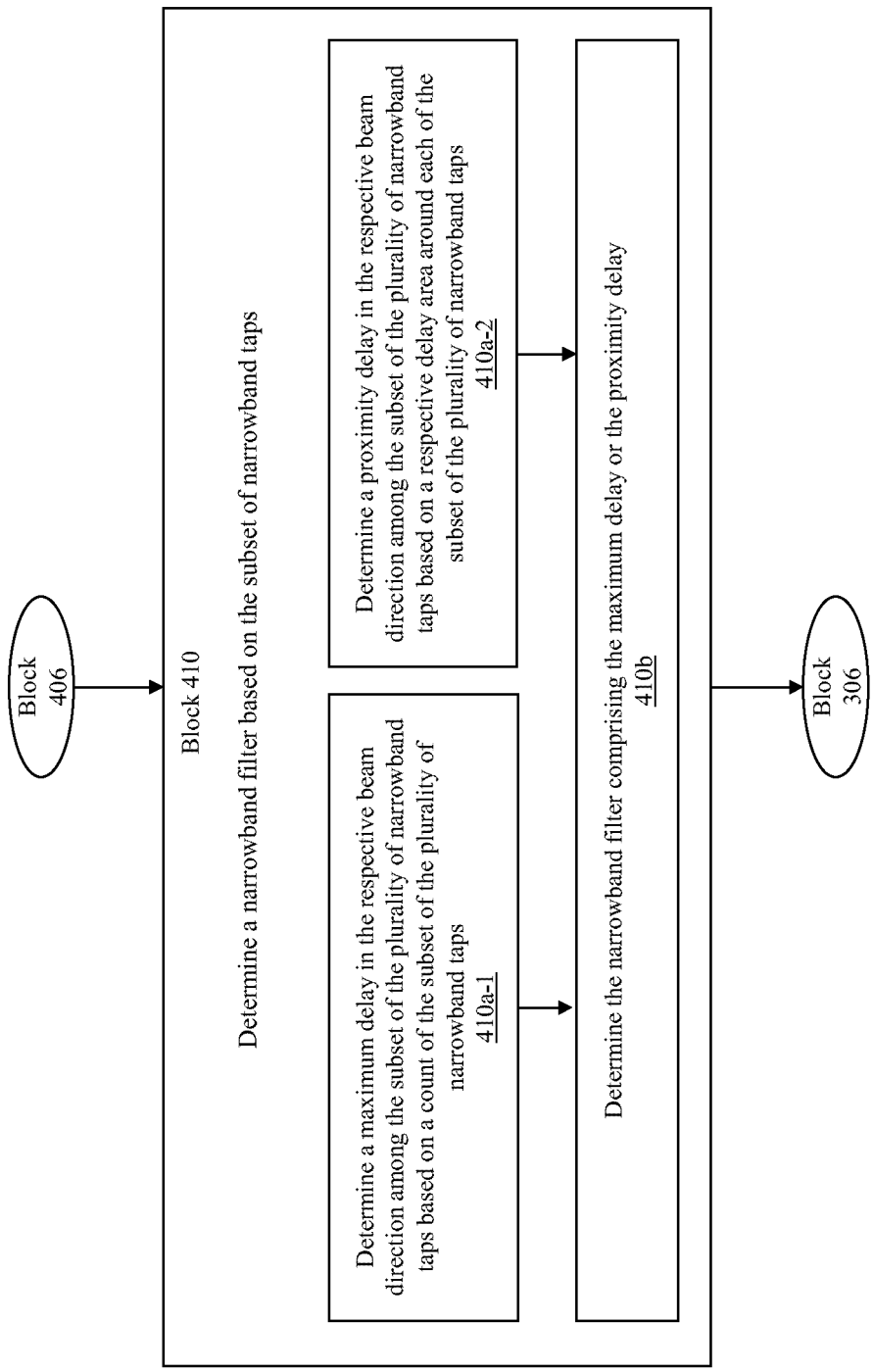

Returning to FIG. 4A, the control circuit 204 may determine a narrowband filter based on the subset of the narrowband taps determined in step 406 (step 410). Herein, the narrowband filter refers to a filter defined by narrowband sounding, which is different from and should not be treated as a physical signal filter of any kind. FIG. 4D is a flowchart showing an example of determining the narrowband filter in step 410. Specifically, the control circuit 204 determines a maximum delay in the respective beam direction among the subset of the narrowband taps based on a count of the number of narrowband taps in the subset of the narrowband taps (step 410*a*-1). Alternatively, the control circuit 204 may determine a proximity delay in the respective beam direction among the subset of the narrowband taps based on a respective delay area around each of the subset of the narrowband taps (step 410*a*-2). Notably, one or more narrowband taps may be associated with each beam direction. In the regard, the term "delay area" refers to a filter to study areas in "delay proximity" to each narrowband tap in every beam direction. The control circuit 204 may then determine the narrowband filter including the maximum delay or the proximity delay (step 410*b*).

The narrowband process will end after performing steps 400 through 410 are performed on each of the narrowband radio channels.

With reference back to FIG. 3A, in case the control circuit 204 has performed the optional narrowband process over the narrowband radio channels, the control circuit 204 may eliminate one or more of the wideband taps based on the narrowband filter if the narrowband filter has been defined (step 306). For example, the control circuit 204 can eliminate those wideband taps having longer than a maximum delay as defined by the narrowband filter. By eliminating some of the wideband taps based on the narrowband filter, it may help reduce computational overhead associated with wideband channel estimation, which will be discussed in detail next, as well as enhance performance since statistical uncertainties are reduced using the narrowband filter.

The control circuit 204 dynamically determines a wideband power threshold, which identifies a number of strongest wideband taps to be used in the wideband channel estimation, based on channel information related to the wideband radio channel (step 308). FIG. 3B is a flowchart showing an example of determining the wideband power threshold in step 308. Specifically, the control circuit 204 determines the wideband power threshold as a function of peak power and signal-to-noise ratio (SNR) (step 308*a*). In a non-limiting example, the control circuit 204 dynamically determines the wideband power threshold such that the wideband power threshold corresponds to a minimum sum of noise power and channel power (step 308*aa*). Herein, the noise power refers to noise power that is included in the channel estimate, while the channel power refers to channel power that is not included in the channel estimate.

With reference back to FIG. 3A, the control circuit 204 may further determine a subset of the wideband taps based on the wideband power threshold (step 310). FIG. 3C is a flowchart showing an example of determining the subset of the wideband taps in step 310. Specifically, the control circuit 204 may determine the subset of the wideband taps that have respective tap powers that are higher than the wideband power threshold (step 310*a*).

With reference back to FIG. 3A, as discussed above, the control circuit 204 may have already eliminated some of the wideband taps in step 306 if the control circuit 204 has received the narrowband filter from the narrowband process. In this regard, in step 310, the control circuit 204 will eliminate some additional wideband taps based on the wideband power threshold, thus helping to further reduce computational overhead associated with the wideband radio channel estimation.

In case the control circuit 204 has performed the narrowband process, the narrowband process would have created the narrowband tap list. As discussed above in FIG. 4C, the control circuit 204 adds the highest-powered narrowband tap over all of the narrowband radio channels into the narrowband tap list after performing the narrowband process across the narrowband radio channels. In this regard, the control circuit 204 may add the highest-powered narrowband tap in the narrowband tap list back to the subset of the wideband taps (step 312). The control circuit 204 can then perform the wideband channel estimation for the wideband radio channel based on the subset of wideband taps (step 314).

Recall that during step 310, the control circuit 204 has eliminated some of the wideband taps for the sake of computational simplicity. Understandably, those eliminated wideband taps likely correspond to weaker tap powers. In some extreme cases, the control circuit 204 may have eliminated all of the wideband taps from the wideband channel estimation. In this regard, by adding the highest-powered narrowband tap to the subset of wideband taps, it may be possible for the control circuit 204 to carry out the channel estimation at least based on the highest-powered narrow band tap. As a result, it may help improve accuracy of the wideband radio channel estimation, particularly under the low-SNR conditions.

In a non-limiting example, the control circuit 204 can determine the wideband power threshold based on the equation (Eq. 1) below.

$$N_{limit} = \underset{N}{\operatorname{argmin}} \left( Nk_{order} \vec{\sigma^2} + \sum_{n=N}^{K} |t_n|^2 \right) \quad \text{(Eq. 1)}$$

Figure 5:
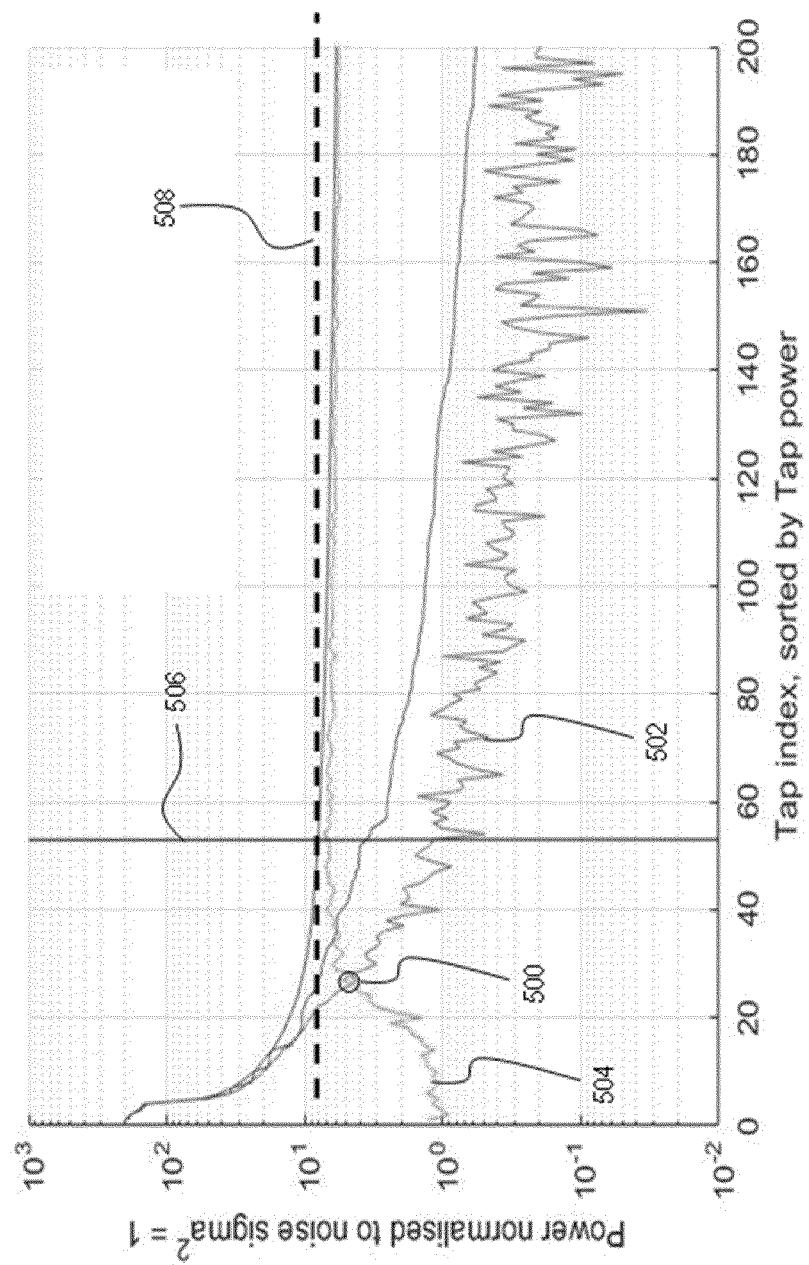
FIG. 5 is a graphic diagram providing an exemplary graphical illustration of a method for determining a wideband power threshold to help reduce computational overhead associated with the wideband radio channel estimation.

Specifically, the Equation (Eq. 1) above is a min search function, wherein $N_{limit}$ represents a count of wideband taps having respective power values above $k_{order}$ $\vec{\sigma}$ (also referred to as "wideband tap count"), $t_n$ represents the wideband taps sorted in a decending order, N represents a search index, and $k_{order}$ represents a scaling factor. FIG. 5 is a graphic diagram providing an exemplary graphical illustration of how the $N_{limit}$ can be determined based on the equation (Eq. 1) for a given $k_{order}$ of 8.

Notably, tap information is a sum of channel and noise, which may not be available to a channel estimator. It is discussed herein merely as a reference to the embodiments of the present disclosure that present an optimal solution. In essence, the equation (Eq. 1) determines the number of the wideband taps that correspond to a minimum sum of the scaled noise estimation, which is included in the wideband channel estimation, and the tap power estimation, which is not included in the wideband channel estimation. In a non-limiting example, a crosspoint 500 can be seen as an optimal decision point since the sum of noise power and channel power are minimized at the crosspoint 500. In this regard, with a properly selected $k_{order}$, the wideband tap count as defined by the equation (Eq. 1) can be equated to finding the crosspoint 500 of a channel power curve 502 and a noise power curve 504.

Referring back to the equation (Eq. 1), it should be noted that the wideband tap count may depend on the scaling factor $k_{order}$. In a non-limiting example, as shown in Table 1 below, the scaling factor $k_{order}$ may be adjusted to dynamically change the wideband tap count based on an estimated SNR in the wideband radio channel.

TABLE 1

| SNR (dB) | Gain Enhancement (dB) | Optimal $k_{order}$ | | | $k_{order}=8$ | |
|---|---|---|---|---|---|---|
| | | $k_{order}$ | Gain (dB) | $N_{limit}$ | Gain (dB) | $N_{limit}$ |
| −40 | 4.3 | 11 | −3.9 | 4 | −8.3 | 25 |
| −30 | 0.4 | 10.2 | −2.0 | 27 | −2.4 | 55 |
| −20 | 0.0 | 8.7 | −0.88 | 187 | −0.88 | 216 |
| −10 | 0.01 | 7 | −0.40 | 1182 | −0.41 | 1023 |
| 0 | 0.0 | 5.3 | −0.23 | 5263 | −0.23 | 3808 |

For example, for the $k_{order}$ of 8, a wideband tap count $N_{limit}$, as illustrated by vertical line 506 in FIG. 5, can be determined according to the equation (Eq. 1). Accordingly, a corresponding power threshold, as illustrated by a power threshold line 508, can be determined. As shown in FIG. 5, the power threshold line 508 does not align with the crosspoint 500, which is an indication that the $k_{order}$ of 8 is not an optimal scaling factor. Thus, it may be desirable to determine an optimal scaling factor $k_{order}$ that can cause the power threshold line 508 to align with the crosspoint 500 as much as possible.

In this regard, it is possible to determine the optimal scaling factor $k_{order}$ based on the equation (Eq. 2) below.

$$k_{order}(K,SNR)=f_1(K)+f_2(SNR) \quad \text{(Eq. 2)}$$

In the equation (Eq. 2) above, $f_1(K)$ is the expected peak power of K noise samples, which is the dominant factor in the equation (Eq. 2). $f_2(SNR)$ is an offset to adjust threshold as function of SNR. $f_2(SNR)$ may be defined heuristically based on simulations over a set of radio channels with different SNR values. In this regard, the optimal scaling factor $k_{order}$ is a function of peak power and SNR.

To further enhance performance, it is possible to also take Radio Channel Richness (also known as Radio Channel Spread) into account, as shown in the equation (Eq. 3) below.

$$k_{order}(K,SNR,CH_{richness})=f_1(K)+f_2(SNR,CH_{richness}) \quad \text{(Eq. 3)}$$

While radio channel may be unknown, an estimate of the Radio Channel Richness can be a known priory from the Spatial Scenario or from the filter delivered from the Narrowband sounding. The relative amount of taps in the preselection filter can be viewed as a measure of Channel Richness, $$H_{richness} = \frac{N_{taps\ in\ filter}}{N_{all\ taps}}.$$

A set of radio channels at different SNR values with tuned optimal thresholds and calculated channel richness in a simulator can create an heuristically based $f_2(SNR, CH_{richness})$. Notably, it is realistic to assume that $f_2(SNR, CH_{richness})$ will reduce the threshold both when SNR and $CH_{richness}$ increase.

As shown in table 1, the wideband tap count $N_{limit}$ as determined based on the scaling factor $K_{order}=8$ may not be the optimal wideband tap count that provides the best possible gain enhancement over an SNR span of −40 dB to 0 dB. As such, assuming that all taps to be pure noise, it may be possible to determine an expected value(s) of highest tap power and use the determined highest noise power as a baseline to determine a scaling factor. The determined scaling factor may be used directly as the optimal scaling factor or be slightly reduced to generate the optimal scaling factor. Notably, majority of the taps are dominated by noise. To avoid pure noise taps to be selected, it may be possible to select expected highest noise power as the scaling factor. As number of the selected taps with higher SNR increase, it may enhance channel estimation to select a few noise taps, which can be achieved by reducing the scaling factor $k_{order}$.

In a non-limiting example, based on an approximation that majority of taps are dominated by noises, the expected value of highest noise power can be determined based on the equation (Eq. 4) below.

$$E(\text{peak power})=\int_0^\infty x K\ cdf(x)^{K-1} pdf(x)dx \quad \text{(Eq. 4)}$$

In the equation (Eq. 4) above, K represents a number of samples, while a cumulative density function cdf(x) and a probability density function pdf(x) are both related to chi-squared statistics. The equation (Eq. 4) may be expressed in a more general equation (Eq. 5) below.

$$E(k\text{:th peak power}) = \int_0^\infty x \frac{K!}{(K-k)!(k-1)!} * cdf(x)^{K-k} * (1-cdf(x))^{k-1} * pdf(x)dx \quad \text{(Eq. 5)}$$

Notably, it may be understandable that higher SNR may enable more accurate channel estimates, as can be visualized with a higher wideband tap count. With a higher wideband tap count, the relative negative effect of selecting a pure noise tap will decrease since the number of taps is larger. As shown in Table 1, it may be desirable to reduce the scaling factor for higher SNR, which can be done by selecting a higher $k_{order}$ when calculating expected peak power in the Equation (Eq. 5).

Figure 6:
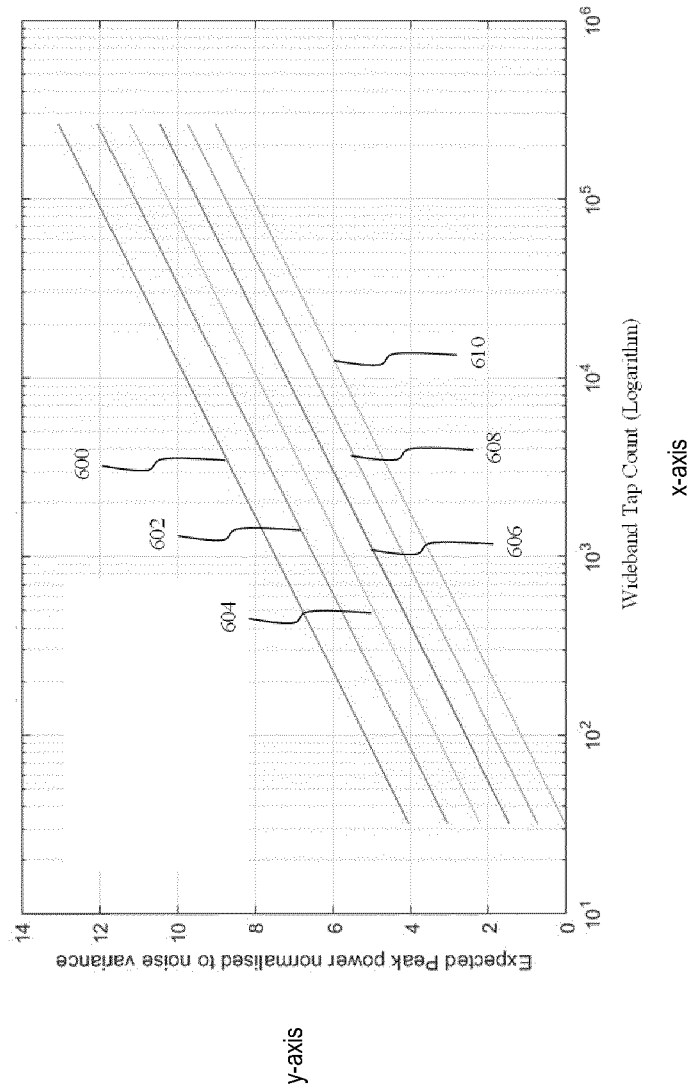
FIG. 6 is a graphic diagram providing an exemplary illustration of a linear relationship between an expected peak noise power(s) and a logarithm of the wideband tap count.

Notably, the equation (Eq. 5) is a complex equation to solve. In this regard, as shown in FIG. 6, several values have been calculated using input values covering the interested area of input values. Specifically, FIG. 6 shows that it is possible to select a simplified approximate formula to solve the equation (Eq. 5). FIG. 6 is a graphic diagram providing an exemplary illustration of a linear relationship between an expected peak noise power(s) and a logarithm of the wideband tap count. Notably, a peak noise power(s) can be approximated as a linear function based on logarithm of N and another independent function based on parameter k in the equation (Eq. 3). FIG. 6 illustrates graphic curves

600-610 that illustrate a linear relationship(s) between a $1^{st}$, a $2^{nd}$, a $4^{th}$, an $8^{th}$, a $16^{th}$, and a $32^{nd}$ largest peak of expected peak noise power and the logarithm of the wideband tap count.

From the plot in FIG. 6, it is possible to fit a simple linear relationship between the expected peak power and the logarithm of the number of wideband taps, K, as shown in a simplified polynomial in the equation (Eq. 6) below.

$$\text{ExpectedPeakPower}(k,K) \approx 0.607 + 2.2877 \log_{10}K - (0.295(\log_{10}k)^3 - 1.0377(\log_{10}k)^2 + 3.5687 \log_{10}k) \quad \text{(Eq. 6)}$$

In the equation (Eq. 6) above, k represents the peak number as shown in FIG. 6. Given that the expected peak power in FIG. 6 is normalized to noise level, a y-axis in FIG. 6 is equivalent to the scaling factor $k_{order}$. Based on the equation (Eq. 4) and Table 1, it may be possible to draft a polynomial fit for the optical scaling factor $k_{order}$ degradation as a function of SNR, as shown in the equation (Eq. 7) below.

$$k_{order\_reduction}(\text{SNR\_dB}) \approx -5.83*10^{-5}\text{SNR}_{dB}^3 - 2.1* 10^{-3}\text{SNR}_{dB}^2 + 0.153\text{SNR}_{dB} + 6.234 \quad \text{(Eq. 7)}$$

Accordingly, the optimal scaling factor $k_{order}$ for use in the equation (Eq. 1) may be determined based on the equation (Eq. 8) below.

$$k_{order}(\text{SNR}_{dB},K) \approx 0.607 + 2.2877 \log_{10}K - (-5.83* 10^{-5}\text{SNR}_{dB}^3 - 2.1*10^{-3}\text{SNR}_{dB}^2 + 0.153\text{SNR}_{dB} + 6.234) \quad \text{(Eq. 8)}$$

Figure 7:
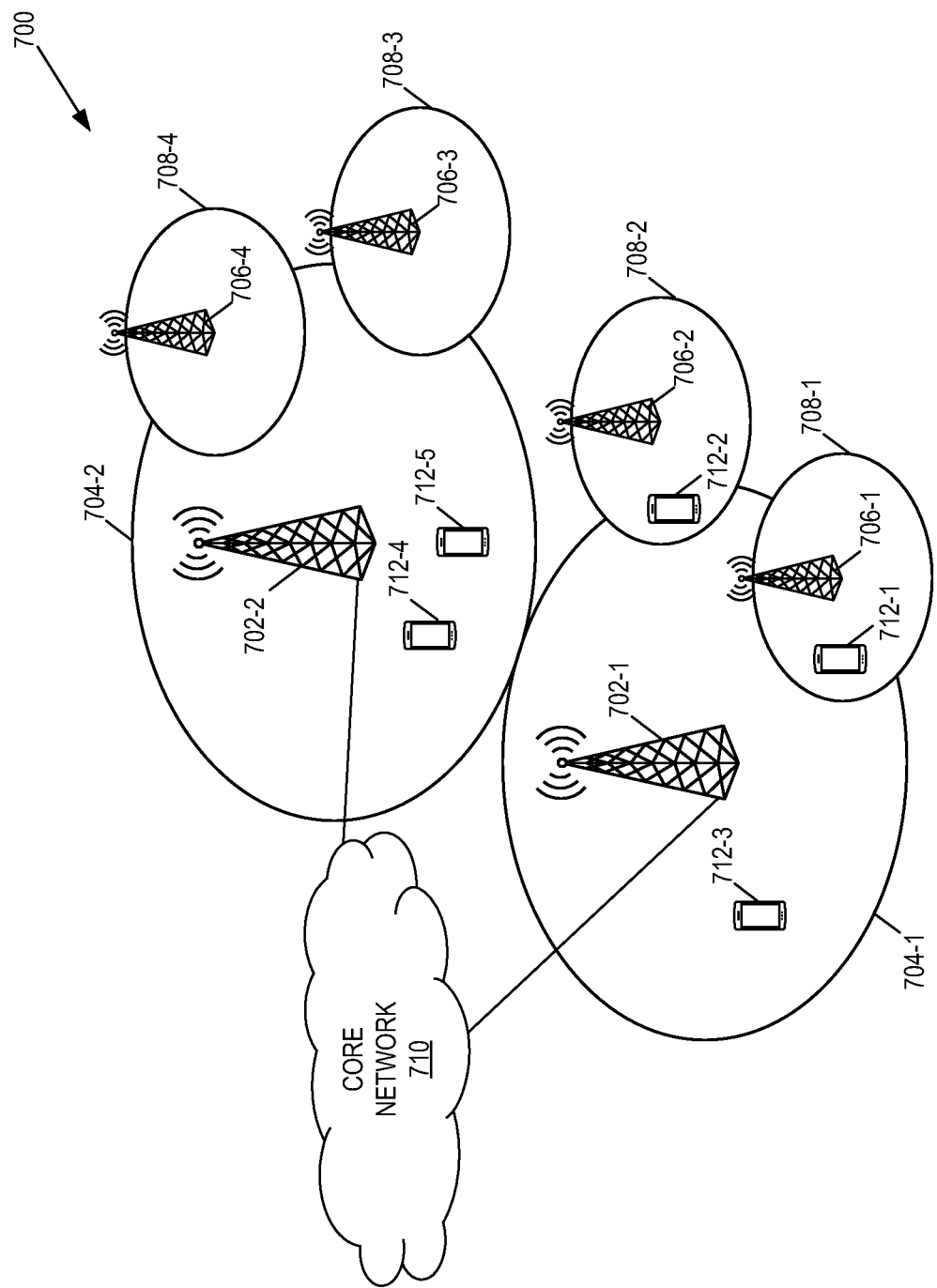
FIG. 7 illustrates one example of a cellular communications network in which embodiments of the present disclosure may be implemented to perform radio channel estimation over the large span of SNR conditions.

In the equation (Eq. 8) above, K represents a number after prefiltering. As such, K may not only be a dependent of such factors as beam bandwidth. FIG. 7 illustrates one example of a cellular communications network 700 in which embodiments of the present disclosure may be implemented to perform radio channel estimation over the large span of SNR conditions. In the embodiments described herein, the cellular communications network 700 is a 5G NR network. In this example, the cellular communications network 700 includes base stations 702-1 and 702-2, which in LTE are referred to as eNBs and in 5G NR are referred to as gNBs, controlling corresponding macro cells 704-1 and 704-2. The base stations 702-1 and 702-2 are generally referred to herein collectively as base stations 702 and individually as base station 702. Likewise, the macro cells 704-1 and 704-2 are generally referred to herein collectively as macro cells 704 and individually as macro cell 704. The cellular communications network 700 may also include a number of low power nodes 706-1 through 706-4 controlling corresponding small cells 708-1 through 708-4. The low power nodes 706-1 through 706-4 can be small base stations (such as pico or femto base stations) or Remote Radio Heads (RRHs), or the like. Notably, while not illustrated, one or more of the small cells 708-1 through 708-4 may alternatively be provided by the base stations 702. The low power nodes 706-1 through 706-4 are generally referred to herein collectively as low power nodes 706 and individually as low power node 706. Likewise, the small cells 708-1 through 708-4 are generally referred to herein collectively as small cells 708 and individually as small cell 708. The base stations 702 (and optionally the low power nodes 706) are connected to a core network 710.

The base stations 702 and the low power nodes 706 provide service to wireless devices 712-1 through 712-5 in the corresponding cells 704 and 708. The wireless devices 712-1 through 712-5 are generally referred to herein collectively as wireless devices 712 and individually as wireless device 712. The wireless devices 712 are also sometimes referred to herein as UEs.

Figure 8:
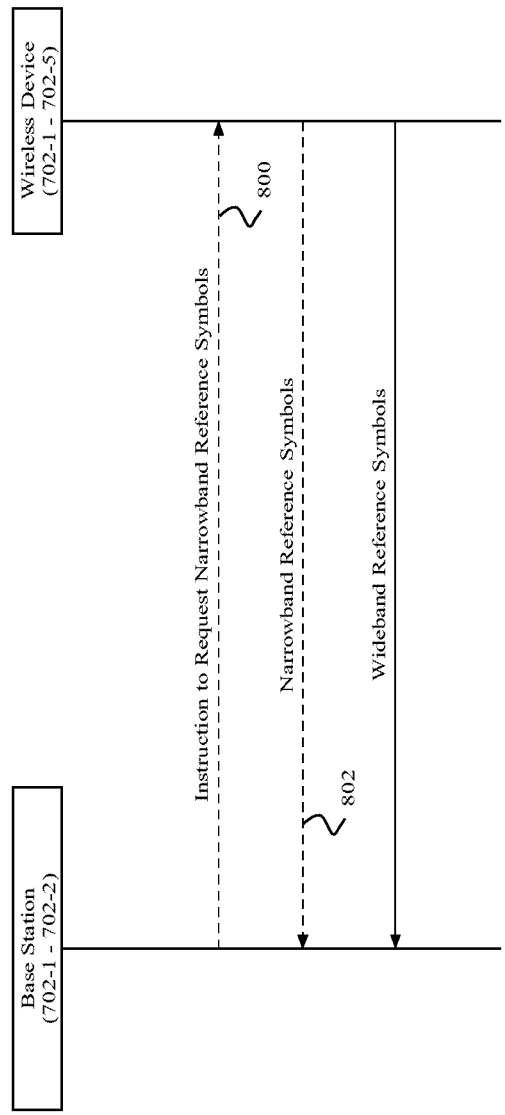
FIG. 8 is a flow diagram providing exemplary signaling for enabling the narrowband radio channel estimation based on the method in FIGS. 4A-4D.

In a non-limiting example, any of the base stations 702-1 and 702-2 and/or any of the low power nodes 706-1 through 706-4 can be configured to function as the radio node 200 in FIG. 2 to perform the wideband radio channel estimation as described in FIGS. 3A-3C and the narrowband radio channel estimation as described in FIGS. 4A-4D. As such, the base stations 702-1 and 702-2 and/or the low power nodes 706-1 through 706-4 can provide the instruction to instruct any of the wireless devices 712-1 through 712-5 to transmit the narrowband reference symbols in the narrowband radio channel(s). In this regard, FIG. 8 is a flow diagram providing exemplary signaling for enabling the narrowband process based on the method in FIGS. 4A-4D.

For example, the base stations 702-1 and 702-2 have been performing the wideband radio channel estimation based on the wideband reference symbols transmitted by the wireless devices 712-1 through 712-5. The base stations 702-1 and 702-2 then decide to perform the optional narrowband process based on the method described in FIGS. 4A-4D. As such, the base stations 702-1 and 702-2 provide the indication 800 to instruct the wireless devices 712-1 through 712-5 to transmit the narrowband reference symbols. In a non-limiting example, the base stations 702-1 and 702-2 provide the indication 800 via a control channel, such as a physical downlink control channel (PDCCH). In response, the wireless devices 712-1 through 712-5 transmit narrowband reference symbols 802 to the base stations 702-1 and 702-2.

In one example, the base stations 702-1 and 702-2 provide the indication 800 to instruct the wireless devices 712-1 through 712-5 to transmit the narrowband reference symbols periodically. Accordingly, the wireless devices 712-1 through 712-5 transmit the narrowband reference symbols 802 to the base stations 702-1 and 702-2 on a periodic basis. In one example, the base stations 702-1 and 702-2 provide an indication 800 to instruct the wireless devices 712-1 through 712-5 to transmit the narrowband reference symbols only once. Accordingly, the wireless devices 712-1 through 712-5 transmit the narrowband reference symbols 802 to the base stations 702-1 and 702-2 and then stop. Regardless of whether the wireless devices 712-1 through 712-5 are transmitting the narrowband reference symbols 802 periodically or only once, the wireless devices 712-1 through 712-5 will continue transmitting the wideband reference symbols to the base stations 702-1 and 702-2.

Figure 9:
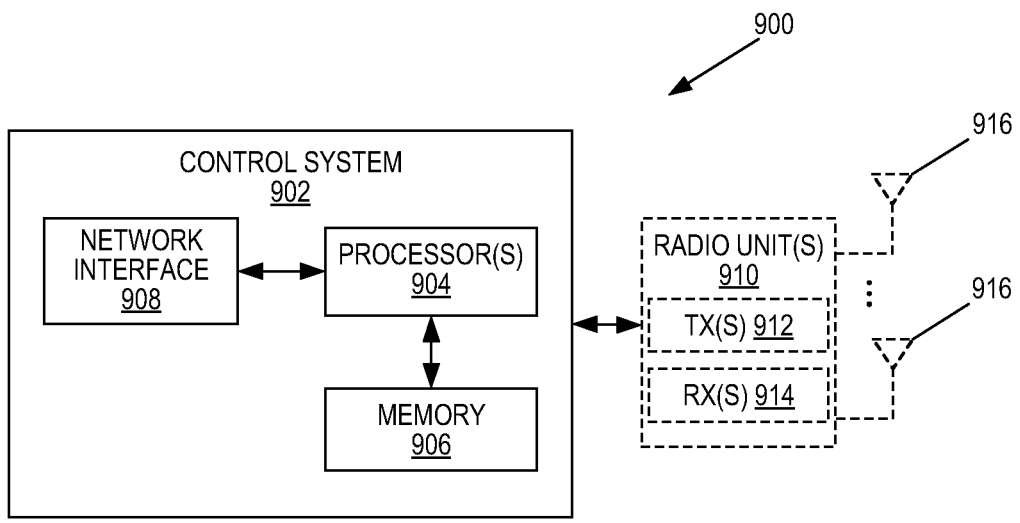
FIG. 9 is a schematic block diagram of a radio access node according to some embodiments of the present disclosure.

FIG. 9 is a schematic block diagram of a radio access node 900 according to some embodiments of the present disclosure. The radio access node 900 may be, for example, the radio node 200 of FIG. 2 and/or the base stations 702-1 and 702-2 of FIG. 7. As illustrated, the radio access node 900 includes a control system 902 that includes one or more processors 904 (e.g., Central Processing Units (CPUs), Application Specific Integrated Circuits (ASICs), Field Programmable Gate Arrays (FPGAs), and/or the like), memory 906, and a network interface 908. The one or more processors 904 are also referred to herein as processing circuitry. In a non-limiting example, the processors 904 can function as the controller 214 in the radio node 200 of FIG. 2. In addition, the radio access node 900 includes one or more radio units 910 that each includes one or more transmitters 912 and one or more receivers 914 coupled to one or more antennas 916. The radio units 910 may be referred to as or be a part of radio interface circuitry. In a non-limiting example, the radio units 910 can function as the radio interface 202 in the radio node 200 of FIG. 2. In some embodiments, the radio unit(s) 910 is external to the control system 902 and connected to the control system 902 via, e.g., a wired connection (e.g., an optical cable). However, in some other embodiments, the radio unit(s) 910 and potentially the antenna(s) 916 are integrated together with the control system 902. The one or more processors 904 operate to provide one or more functions of the radio access node 900 as described herein. In some embodiments, the function(s) are implemented in software that is stored, e.g., in the memory 906 and executed by the one or more processors 904.

FIG. 10 is a schematic block diagram that illustrates a virtualized embodiment of the radio access node 900 according to some embodiments of the present disclosure. This discussion is equally applicable to other types of network nodes. Further, other types of network nodes may have similar virtualized architectures.

As used herein, a "virtualized" radio access node is an implementation of the radio access node 900 in which at least a portion of the functionality of the radio access node 900 is implemented as a virtual component(s) (e.g., via a virtual machine(s) executing on a physical processing node(s) in a network(s)). As illustrated in this example, the radio access node 900 includes the control system 902 that includes the one or more processors 904 (e.g., CPUs, ASICs, FPGAs, and/or the like), the memory 906, the network interface 908, and the one or more radio units 910 that each include the one or more transmitters 912 and the one or more receivers 914 coupled to the one or more antennas 916, as described above. The control system 902 is connected to the radio unit(s) 910 via, for example, an optical cable or the like. The control system 902 is connected to one or more processing nodes 1000 coupled to or included as part of a network(s) 1002 via the network interface 908. Each processing node 1000 includes one or more processors 1004 (e.g., CPUs, ASICs, FPGAs, and/or the like), memory 1006, and a network interface 1008.

In this example, functions 1010 of the radio access node 900 described herein are implemented at the one or more processing nodes 1000 or distributed across the control system 902 and the one or more processing nodes 1000 in any desired manner. In some particular embodiments, some or all of the functions 1010 of the radio access node 900 described herein are implemented as virtual components executed by one or more virtual machines implemented in a virtual environment(s) hosted by the processing node(s) 1000. As will be appreciated by one of ordinary skill in the art, additional signaling or communication between the processing node(s) 1000 and the control system 902 is used in order to carry out at least some of the desired functions 1010. Notably, in some embodiments, the control system 902 may not be included, in which case the radio unit(s) 910 communicates directly with the processing node(s) 1000 via an appropriate network interface(s).

In some embodiments, a computer program including instructions which, when executed by at least one processor, causes the at least one processor to carry out the functionality of radio access node 900 or a node (e.g., a processing node 1000) implementing one or more of the functions 1010 of the radio access node 900 in a virtual environment according to any of the embodiments described herein is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 11:
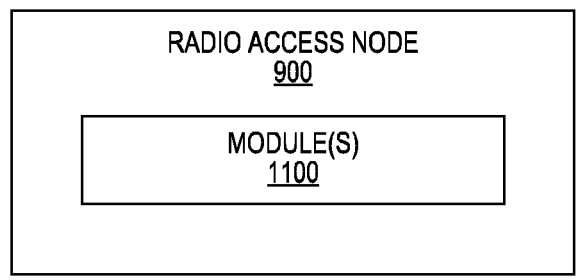
FIG. 11 is a schematic block diagram of the radio access node of FIG. 9 according to some other embodiments of the present disclosure.

FIG. 11 is a schematic block diagram of the radio access node 900 according to some other embodiments of the present disclosure. The radio access node 900 includes one or more modules 1100, each of which is implemented in software. The module(s) 1100 provides the functionality of the radio access node 900 described herein. This discussion is equally applicable to the processing node 1000 of FIG. 10 where the modules 1100 may be implemented at one of the processing nodes 1000 or distributed across multiple processing nodes 1000 and/or distributed across the processing node(s) 1000 and the control system 902.

Figure 12:
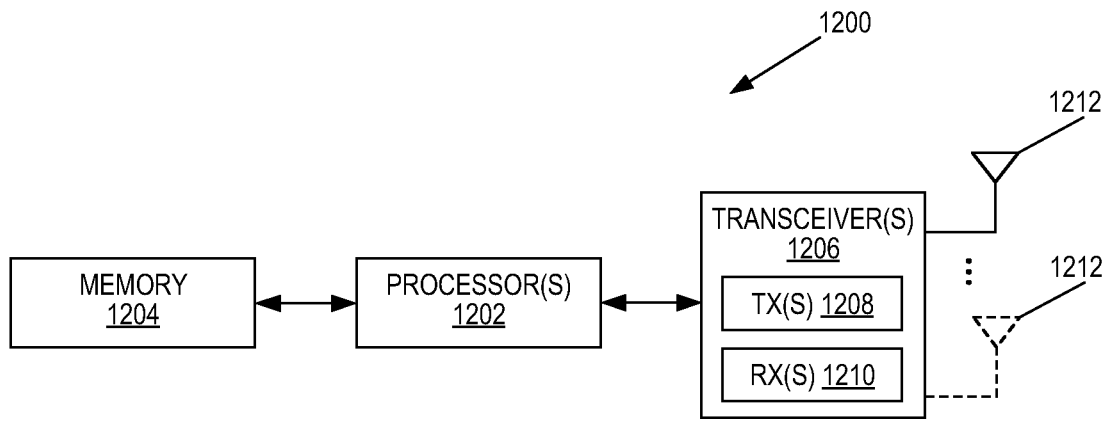
FIG. 12 is a schematic block diagram of a User Equipment (UE) according to some embodiments of the present disclosure.

FIG. 12 is a schematic block diagram of a UE 1200 according to some embodiments of the present disclosure. As illustrated, the UE 1200 includes one or more processors 1202 (e.g., CPUs, ASICs, FPGAs, and/or the like), memory 1204, and one or more transceivers 1206 each including one or more transmitters 1208 and one or more receivers 1210 coupled to one or more antennas 1212. The transceiver(s) 1206 includes radio-front end circuitry connected to the antenna(s) 1212 that is configured to condition signals communicated between the antenna(s) 1212 and the processor(s) 1202, as will be appreciated by one of ordinary skill in the art. The processors 1202 are also referred to herein as processing circuitry. The transceivers 1206 are also referred to herein as radio circuitry. In some embodiments, the functionality of the UE 1200 described above may be fully or partially implemented in software that is, e.g., stored in the memory 1204 and executed by the processor(s) 1202. Note that the UE 1200 may include additional components not illustrated in FIG. 12 such as, e.g., one or more user interface components (e.g., an input/output interface including a display, buttons, a touch screen, a microphone, a speaker(s), and/or the like and/or any other components for allowing input of information into the UE 1200 and/or allowing output of information from the UE 1200), a power supply (e.g., a battery and associated power circuitry), etc.

In a non-limiting example, the transceivers 1206 can receive the instruction 800 from the base stations 702-1 and 702-2, as an example, that instructs the UE 1200 to transmit the narrowband reference symbols 802. The processor(s) 1202 may respond to the instruction 800 to cause the transceivers 1206 to transmit the narrowband reference symbols 802, either periodically or at once.

In some embodiments, a computer program including instructions which, when executed by at least one processor, causes the at least one processor to carry out the functionality of the UE 1200 according to any of the embodiments described herein is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 13:
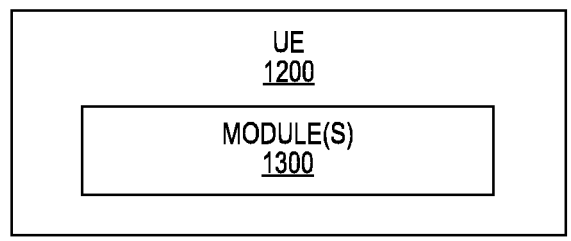
FIG. 13 is a schematic block diagram of the UE of FIG. 12 according to some other embodiments of the present disclosure.

FIG. 13 is a schematic block diagram of the UE 1200 according to some other embodiments of the present disclosure. The UE 1200 includes one or more modules 1300, each of which is implemented in software. The module(s) 1300 provide the functionality of the UE 1300 described herein.

At least some of the following abbreviations may be used in this disclosure. If there is an inconsistency between abbreviations, preference should be given to how it is used above. If listed multiple times below, the first listing should be preferred over any subsequent listing(s).

3G Third Generation
3GPP Third Generation Partnership Project
4G Fourth Generation
5G Fifth Generation
5G-NR Fifth Generation New Radio
AP Access Point
ASIC Application Specific Integrated Circuit
BSC Base Station Controller BTS Base Transceiver Station
CD Compact Disk
COTS Commercial Off-the-Shelf
CPE Customer Premise Equipment
CPU Central Processing Unit
CSI Channel State Information
D2D Device-to-Device
DAS Distributed Antenna System
DCT Discrete Cosine Transformation
DFT Discrete Fourier Transform
DMRS Demodulation Reference Signal
DSP Digital Signal Processor
DVD Digital Video Disk
eNB Enhanced or Evolved Node B
E-SMLC Evolved Serving Mobile Location Center
FPGA Field Programmable Gate Array
GHz Gigahertz
gNB New Radio Base Station
gNB-CU New Radio Base Station Central Unit
gNB-DU New Radio Base Station Distributed Unit
GSM Global System for Mobile Communications
IoT Internet of Things
IP Internet Protocol
LEE Laptop Embedded Equipment
LME Laptop Mounted Equipment
LTE Long Term Evolution
M2M Machine-to-Machine
MANO Management and Orchestration
MCE Multi-Cell/Multicast Coordination Entity
MDT Minimization of Drive Tests
MIMO Multiple Input Multiple Output
MME Mobility Management Entity
mmWave Millimeter Wave
MSC Mobile Switching Center
MSR Multi-Standard Radio
MTC Machine Type Communication
MU Massive Multiuser
NB-IoT Narrowband Internet of Things
NFV Network Function Virtualization
NIC Network Interface Controller
NR New Radio
NRF Network Function Repository Function
O&M Operation and Maintenance
OFDM Orthogonal Frequency Division Multiplexing
OSS Operations Support System
OTT Over-the-Top
PC Personal Computer
PDA Personal Digital Assistant
P-GW Packet Data Network Gateway
PRACH Physical Random-Access Channels
RAM Random Access Memory
RAN Radio Access Network
RAT Radio Access Technology
RB Resource Block
RE Resource Element
RF Radio Frequency
RNC Radio Network Controller
ROM Read Only Memory
RRH Remote Radio Head
RRU Remote Radio Unit
SCEF Service Capability Exposure Function
SOC System on a Chip
SON Self-Organizing Network
SNR Signal to Noise Ratio
SRS Sounding Reference Signal
TDMA Time-Division Multiple Access
UE User Equipment
USB Universal Serial Bus
V2I Vehicle-to-Infrastructure
V2V Vehicle-to-Vehicle
V2X Vehicle-to-Everything
VMM Virtual Machine Monitor
VNE Virtual Network Element
VNF Virtual Network Function
VoIP Voice over Internet Protocol
WCDMA Wideband Code Division Multiple Access
WiMax Worldwide Interoperability for Microwave Access Those skilled in the art will recognize improvements and modifications to the embodiments of the present disclosure. All such improvements and modifications are considered within the scope of the concepts disclosed herein.

What is claimed is:

1. A radio node configured to perform radio channel estimation, the radio node comprising:
a radio interface configured to receive a plurality of wideband reference symbols corresponding to a wideband radio channel having a wideband bandwidth; and
a control circuit configured to:
convert the plurality of wideband reference symbols into a plurality of wideband taps each having a complex value and associated with a respective beam direction and a respective tap delay;
dynamically determine a wideband power threshold based on channel information related to the wideband radio channel, the channel information related to the wideband channel comprising peak power and signal-to-noise ratio, SNR, the dynamic determination of the wideband power threshold being as a function of a value of the peak power and the SNR;
determine a subset of the plurality of wideband taps based on the wideband power threshold; and
generate a channel estimate for the wideband radio channel based on the subset of the plurality of wideband taps.

2. The radio node of claim 1, wherein the control circuit is further configured to pre-filter the channel information obtained from the plurality of wideband reference symbols to reduce noise in the channel-related information prior to or after converting the plurality of wideband reference symbols into the plurality of wideband taps.

3. The radio node of claim 1, wherein the control circuit is further configured to dynamically determine the wideband power threshold that corresponds to a minimum sum of noise power and channel power.

4. The radio node of claim 1, wherein the subset of the plurality of wideband taps is a subset of the plurality of wideband taps having respective tap powers higher than the wideband power threshold.

5. The radio node of claim 1, further configured to:
perform a narrowband process over one or more narrowband radio channels to generate a narrowband filter, each of the one or more narrowband radio channels fall within the wideband radio channel and have a narrowband bandwidth narrower than the wideband bandwidth; and
eliminate one or more of the plurality of wideband taps based on the narrowband filter.

6. The radio node of claim 5, wherein during the narrowband process:
the radio interface is further configured to receive a plurality of narrowband reference symbols corresponding to each of the one or more narrowband radio channels; and the control circuit is further configured to:
for each of the one or more narrowband radio channels:
convert the plurality of narrowband reference symbols into a plurality of narrowband taps each having a complex value associated with a respective beam direction and a respective tap delay;
determine a narrowband power threshold based on channel information related to the narrowband radio channel; and
determine a subset of the plurality of narrowband taps each corresponding to a highest tap power in the respective beam direction based on the narrowband power threshold; and
determine the narrowband filter based on the subset of the plurality of narrowband taps.

7. The radio node of claim 6, wherein the control circuit is further configured to, for each of the one or more narrowband channels, update a narrowband tap list based on a highest-powered narrowband tap having a highest respective tap power among the subset of the plurality of narrowband taps.

8. The radio node of claim 7, wherein the narrowband tap list comprises a highest-powered narrowband tap among all of the subset of the plurality of narrowband taps corresponding to the one or more narrowband radio channels.

9. The radio node of claim 6, wherein the control circuit is further configured to:
determine a maximum delay in the respective beam direction among the subset of the plurality of narrowband taps based on a count of narrowband taps in the subset of the plurality of narrowband taps; and
determine the narrowband filter comprising the maximum delay.

10. The radio node of claim 6, wherein the control circuit is further configured to:
determine a proximity delay in the respective beam direction among the subset of the plurality of narrowband taps based on a respective delay area around each of the subset of the plurality of narrowband taps; and
determine the narrowband filter comprising the proximity delay.

11. The radio node of claim 6, wherein the control circuit is further configured to:
determine a noise power estimate and a channel power estimate of a respective one of the one or more narrowband radio channels; and
determine the narrowband power threshold based on the noise power estimate and the channel power estimate of the respective one of the one or more narrowband radio channels.

12. The radio node of claim 6, wherein, for each of the one or more narrowband radio channels, the control circuit is further configured to replace an existing highest-powered narrowband tap in the narrowband tap list with the determined highest-powered narrowband tap among the subset of the plurality of narrowband taps if the respective tap power of the determined highest-powered narrowband tap is higher than the respective tap power of the existing highest-powered narrowband tap in the narrowband tap list.

13. The radio node of claim 12, wherein the control circuit is further configured to add the highest-powered narrowband tap in the narrowband tap list to the subset of the plurality of wideband taps.

14. A method implemented in a radio node for performing radio channel estimation, the method comprising:
receiving a plurality of wideband reference symbols corresponding to a wideband radio channel having a wideband bandwidth;
converting the plurality of wideband reference symbols into a plurality of wideband taps each having a complex value and associated with a respective beam direction and a respective tap delay;
dynamically determining a wideband power threshold based on channel information related to the wideband radio channel, the channel information related to the wideband channel comprising peak power and signal-to-noise ratio, SNR, the dynamic determination of the wideband power threshold being as a function of a value of the peak power and the SNR;
determining a subset of the plurality of wideband taps based on the wideband power threshold; and
generating a channel estimation for the wideband radio channel based on the subset of the plurality of wideband taps.

15. The method of claim 14, further comprising pre-filtering the channel information obtained from the plurality of wideband reference symbols to reduce noise in the channel-related information prior to or after converting the plurality of wideband reference symbols into the plurality of wideband taps.

16. The method of claim 14, further comprising dynamically determining the wideband power threshold that corresponds to a minimum sum of noise power and channel power.

17. The method of claim 14, further comprising determining the subset of the plurality of wideband taps having the respective tap power higher than the wideband power threshold.

18. The method of claim 14, further comprising:
performing a narrowband process over one or more narrowband radio channels to generate a narrowband filter, each of the one or more narrowband radio channels fall within the wideband radio channel and have a narrowband bandwidth narrower than the wideband bandwidth; and
eliminating one or more of the plurality of wideband taps based on the narrowband filter.

* * * * *